US 6,588,012 B2

(12) United States Patent
Tanaka et al.

(10) Patent No.: US 6,588,012 B2
(45) Date of Patent: *Jul. 1, 2003

(54) COMBINATION TERMINAL UNIT

(75) Inventors: Junji Tanaka, Yamatokoriyama (JP); Yukihiko Ueno, Souraku-gun (JP); Takayoshi Sasaoka, Yao (JP); Kentaro Hama, Nara (JP)

(73) Assignee: Sharp Kabushiki Kaisha, Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/135,593

(22) Filed: Aug. 18, 1998

(65) Prior Publication Data
US 2003/0066086 A1 Apr. 3, 2003

(30) Foreign Application Priority Data

Sep. 17, 1997 (JP) .............................. 9-252263

(51) Int. Cl.[7] .............................. H04N 7/16; H04N 7/18; H04N 7/173; H04N 5/91
(52) U.S. Cl. .............................. 725/29; 725/86; 725/131; 386/83
(58) Field of Search .............................. 725/151, 10, 13, 725/14, 9, 16, 82, 78, 86–104, 133, 134, 58, 48, 49, 88, 131; 709/218; 386/68, 1, 83

(56) References Cited

U.S. PATENT DOCUMENTS

| 5,218,633 | A | | 6/1993 | Clagett et al. | |
|---|---|---|---|---|---|
| 5,818,935 | A | * | 10/1998 | Maa | 380/200 |
| 5,883,677 | A | * | 3/1999 | Hofmann | 348/584 |
| 5,961,602 | A | * | 10/1999 | Thompson | 709/229 |
| 5,978,842 | A | * | 11/1999 | Noble | 709/218 |
| 5,988,078 | A | * | 11/1999 | Levine | 110/8 |
| 6,002,720 | A | * | 12/1999 | Yurt et al. | 375/240 |
| 6,012,086 | A | * | 1/2000 | Lowell | 709/218 |

FOREIGN PATENT DOCUMENTS

| FR | 2-677-517 | * 10/1991 |
|---|---|---|
| JP | 7-30872 | 1/1995 |
| JP | 10-51707 | 2/1998 |
| JP | 10-69496 | 3/1998 |

OTHER PUBLICATIONS

Ramanathan et al, "Architectures for Personalized Mulitmedia", IEEE Multimedia, vol. 1, No. 1, Mar. 21, 1994, pp. 37–46.

* cited by examiner

Primary Examiner—Chris Grant
Assistant Examiner—Hunter Lonsberry
(74) Attorney, Agent, or Firm—Nixon & Vanderhye P.C.

(57) ABSTRACT

A combination terminal unit includes at least: inputting device for inputting a retrieval item and an option item; line connecting means capable of establishing a line connection to any of a plurality of media; storage device for storing therein a plurality of retrieval information entities; display device for displaying any of the retrieval information entities; and retrieval controller for, if a retrieval item is inputted by the inputting device, reading out retrieval information entities relevant to the retrieval item from the storage device and displaying the information entities thus read out on the display device and, if a particular retrieval information entity is selected from the displayed retrieval information entities by the inputting device, actuating the line connecting means to establish a line connection to a location of the particular retrieval information entity.

9 Claims, 20 Drawing Sheets

FIG. 3

| TYPE OF INFORMATION | ACCESS INFORMATION | BROADCASTING START TIME | BROADCASTING END TIME | TOPIC |
|---|---|---|---|---|
| INTERNET | http://www.sharp.co.jp/ | --:-- | --:-- | EVENTS IN NARA |
| INTERNET | http://www.sharp.co.jp/shoin/ | --:-- | --:-- | NARA TOURIST INFORMATION |
| PC COMMUNICATIONS | ***FORUM | --:-- | --:-- | TOUR IN NARA |
| FAX INFORMATION | 01-1234-4567 | --:-- | --:-- | NARA TOUR GUIDE |
| FAX INFORMATION | 01-9999-9999 | --:-- | --:-- | VISIT TO TEMPLES IN NARA |
| TELEPHONE INFORMATION | 099-12345 | --:-- | --:-- | RECOMMENDED NARA TOUR PLANS |
| TV PROGRAM | CHANNEL 2 | 1997/2/10 13:00 | 1997/2/10 14:00 | FASCINATING HUNTING IN NARA |
| TV PROGRAM | CHANNEL 4 | 1997/2/10 15:00 | 1997/2/10 16:00 | TOURIST ATTRACTIONS IN NARA |
| | | | | |
| | | | | |

FIG. 4

| | A | B | C | D | E |
|---|---|---|---|---|---|
| 1 | TYPE OF MEDIA | ACCESS INFORMATION | BROADCASTING START TIME | BROADCASTING END TIME | PRIORITY |
| 2 | TV | CHANNEL 2 | 1997/2/10 13:00 | 1997/2/10 14:00 | A |
| 3 | VIDEO | CHANNEL 2 | 1997/2/10 15:00 | 1997/2/10 16:00 | B |
| 4 | TV | CHANNEL 4 | 1997/2/10 19:00 | 1997/2/10 20:00 | B |
| 5 | | | | | |
| 6 | | | | | |
| 7 | | | | | |

FIG. 5

| | A | B | C | D | E |
|---|---|---|---|---|---|
| 1 | TYPE OF INFORMATION | HDD | PRINTER | VIDEO | MD |
| 2 | INTERNET | ○ | × | × | - |
| 3 | PC COMMUNICATIONS | ○ | × | × | - |
| 4 | FAX | × | ○ | × | - |
| 5 | TELEPHONE | × | - | × | ○ |
| 6 | TV | - | - | ○ | - |
| 7 | CATV | - | - | ○ | - |
| 8 | RADIO | - | - | × | ○ |

FIG. 6

|   | A | B |
|---|---|---|
| 1 | GROUP A | ○ |
| 2 | GROUP B | × |
| 3 | GROUP C | × |
| 4 | GROUP D | ○ |

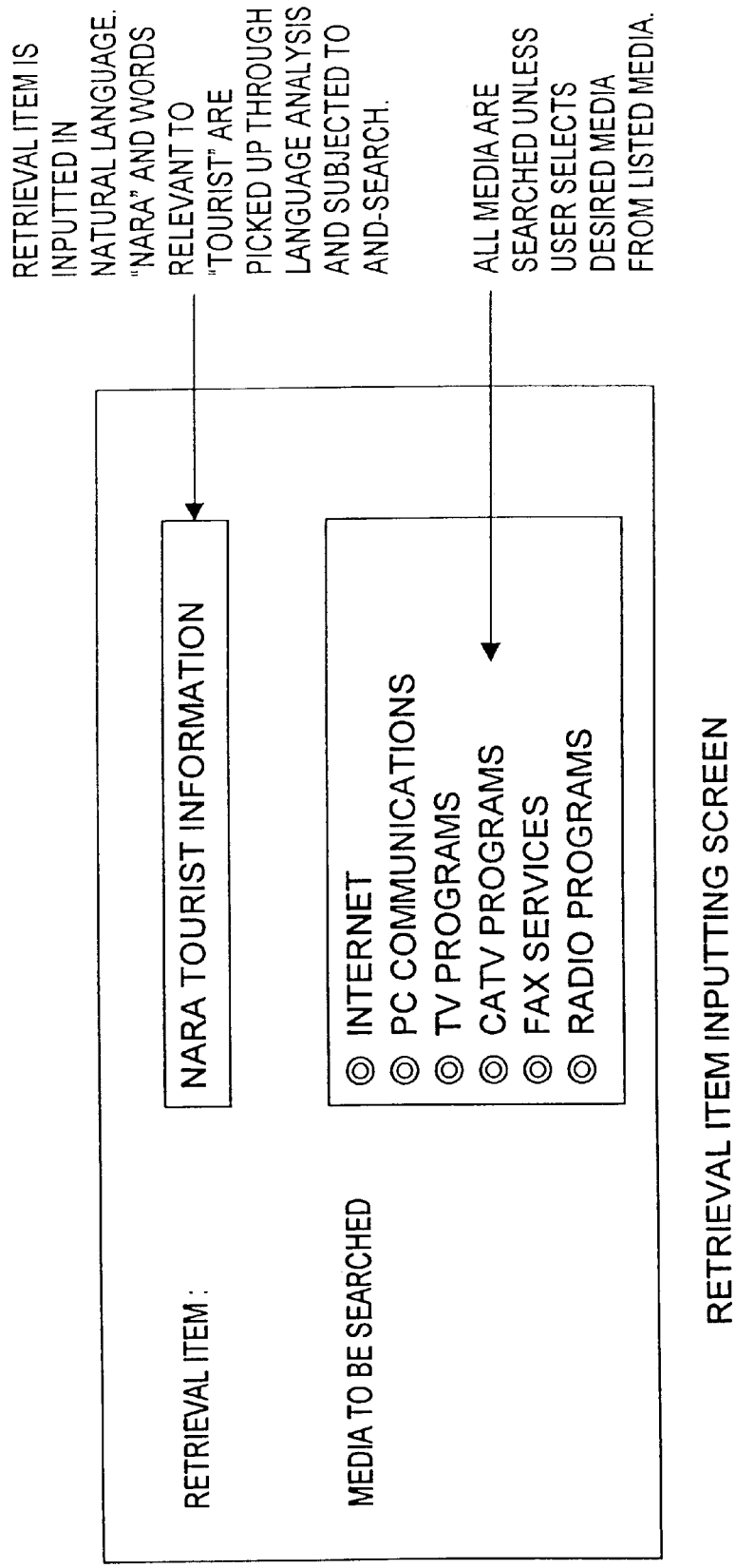

FIG. 15

| | MEDIA | TOPIC | ACCESS INFORMATION | BROADCASTING DATE / TIME |
|---|---|---|---|---|
| 1 | | | | |
| 2 | INTERNET | EVENTS IN NARA | http://www.sharp.co.jp/ | --:-- |
| 3 | INTERNET | NARA TOURIST INFORMATION | http://www.sharp.co.jp/shoin/ | --:-- |
| 4 | PC COMMUNICATIONS | TOUR IN NARA | ***FORUM | --:-- |
| 5 | FAX INFORMATION SERVICE | NARA TOUR GUIDE | 01-1234-4567 | --:-- |
| 6 | FAX INFORMATION SERVICE | VISIT TO TEMPLES IN NARA | 01-9999-9999 | --:-- |
| 7 | TELEPHONE INFORMATION SERVICE | RECOMMENDED NARA TOUR PLANS | 0099-12345 | |
| 8 | TV PROGRAM | FASCINATING HUNTING IN NARA | CHANNEL 2 | 1997/2/10 13:00-14:00 |
| 9 | TV PROGRAM | TOURIST ATTRACTIONS IN NARA | CHANNEL 4 | 1997/2/12 15:00-16:00 |
| 10 | | | | |
| 11 | | | | |

↑ TYPES OF MEDIA   ↑ INFORMATION OUTLINES   ↑ LOCATIONS OF INFORMATION IN MEDIA   ↑ IN CASE OF TV OR RADIO PROGRAMS, BROADCASTING DATE/TIME IS SHOWN.

RETRIEVAL INFORMATION LIST

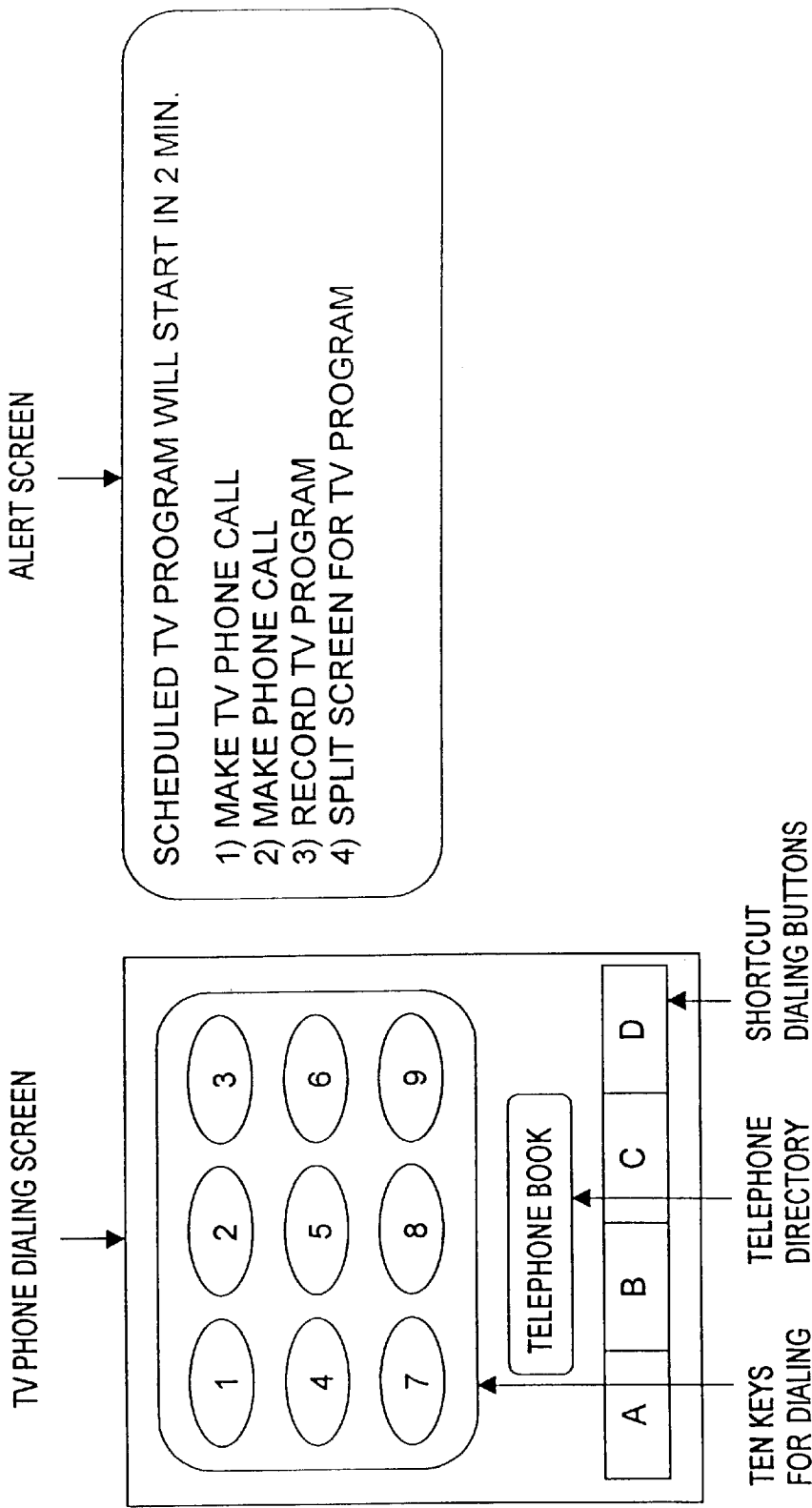

TV SCREEN WITH MESSAGE FOR SCHEDULE INFORMATION

COMBINATION TERMINAL UNIT

CROSS-REFERENCE TO RELATED APPLICATION

This application is related to Japanese application No. HEI 9(1997)-252263, filed on Sep. 17, 1997 whose priority is claimed under 35 USC §119, the disclosure of which is incorporated by reference in its entirety.

BACKGROUND OF THE INVENTION

1. Field of the Invention

The present invention relates to a combination terminal unit and, more particularly, to a combination terminal unit capable of inputting and outputting various types of data such as TV broadcasting data, telephone data, FAX data and interactive communication data.

2. Description of the Related Art

Combination terminal units have recently been developed which are capable of transmitting and receiving various types of data such as TV broadcasting data, TV phone data, voice phone data and FAX data.

Some of the combination terminal units are capable of receiving a TV phone call even during reception of a TV broadcast. For example, a TV phone system with a TV broadcast receiver is disclosed in Japanese Unexamined Patent Publication No. HEI 7(1995)-30872. The TV phone system is designed to selectively receive a phone call only from any of preliminarily registered calling parties or from any of high priority calling parties among the preliminarily registered parties upon arrival of the phone call during reception of a TV broadcast.

Conventional media such as TV broadcast, radio broadcast and newspapers unilaterally provide information to ordinary people. It has recently become possible to obtain necessary information on demand from media such as FAX information services, PC communications services, Internet communications services and pay telephone information services (e.g., Dial Q2 in Japan) through bilateral data communications.

Connection and operation procedures for information acquisition from the media vary depending upon the media to be connected. Further, the quality and quantity of information transmitted through the media vary depending upon the media. Therefore, it is difficult to obtain desired information and, if some information can be obtained, it is necessary to check the obtained information.

Retrieval procedures for retrieving necessary information from a tremendous amount of information also vary depending upon the media. This imposes a heavy burden on users.

In the combination terminal unit, various types of information should be processed in large quantity by utilizing single data receiving and displaying means. Therefore, if information from one medium arrives during reception of information inputted from another medium, the information reception may be interrupted. Conversely, the information reception may prevent reception of urgent information. That is, various information inputs may conflict with each other in the combination terminal unit.

Further, it is desirable to view real-time image information upon arrival thereof, even if other information is displayed on a display of the combination terminal unit, by displaying the image information in parallel.

SUMMARY OF THE INVENTION

In accordance with the present invention, there is provided a combination terminal unit which comprises: inputting device for inputting a retrieval item and an option item; line connecting means capable of establishing a line connection to any of a plurality of media; storage device for storing therein a plurality of retrieval information entities; display device for displaying any of the retrieval information entities; and retrieval controller for, if a retrieval item is inputted by the inputting device, reading out retrieval information entities relevant to the retrieval item from the storage device and displaying the information entities thus read out on the display device and, if a particular retrieval information entity is selected from the displayed retrieval information entities by the inputting device, actuating the line connecting means to establish a line connection to a location of the particular retrieval information entity.

With this combination terminal unit, a user can access desired information by performing a retrieval operation without considering the location of the information.

BRIEF DESCRIPTION OF THE DRAWINGS

FIG. 3 illustrates one exemplary access information table according to the present invention;

FIG. 4 illustrates a schedule table which stores schedule information;

FIG. 5 illustrates an unattended mode storage device table;

FIG. 6 illustrates a priority level table for reception of telephone calls;

FIG. 14 illustrates an exemplary screen for inputting a retrieval item;

FIG. 15 illustrates an exemplary screen of a retrieval information list;

FIG. 16 illustrates an exemplary alert screen for a scheduled TV program;

DETAILED DESCRIPTION OF THE PREFERRED EMBODIMENTS

Figure 1:
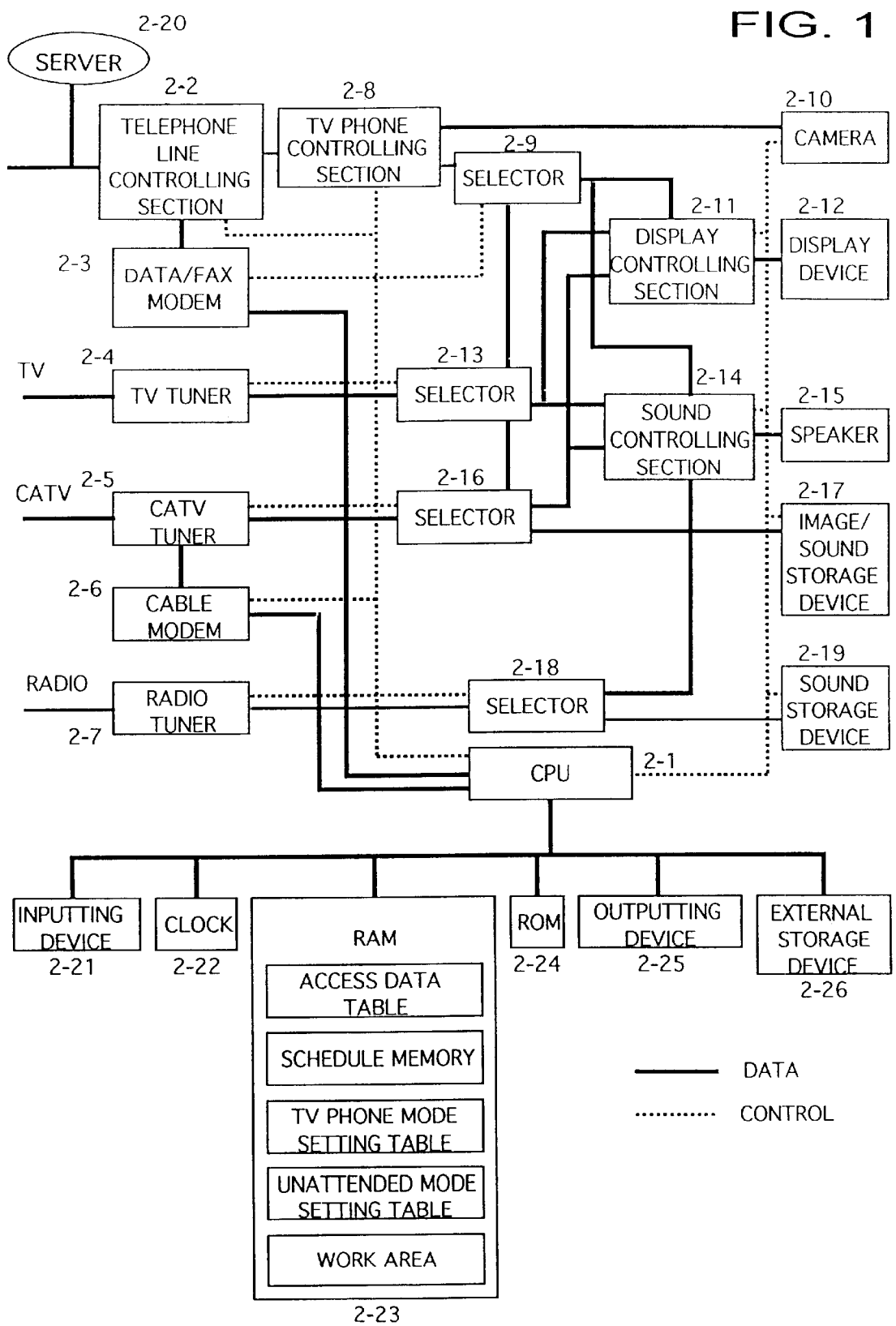
FIG. 1 is a block diagram illustrating the basic construction of a combination terminal unit according to one embodiment of the present invention.

The present invention provides a combination terminal unit which includes input device, line connecting means, storage device, display device and retrieval means, and permits-a user to access desired information by performing a retrieval operation without considering the location of the information.

Usable as the input device in the present invention are a keyboard, a touch panel, and a pointing device such as a mouse or a trackball.

The line connecting means is physically connected to a telephone line, an ISDN line and the like, and logically performs line connection and communication operations for data transmission between terminal units on the basis of predetermined communication protocols.

Examples of specific media include on-air TV, CATV (cable television) and radio broadcasting, and TV phone, voice phone, FAX, PC and Internet communications through which information such as of image data, sound data, graphic data, symbol data and character data is transmitted.

The line connecting means preferably includes physical interfaces for connection to the plurality of media. For example, the line connecting means includes antenna terminals for receiving on-air TV broadcast and radio broadcast, a modular terminal for connection to a subscriber telephone line for voice telephone and FAX communications, and a terminal for connection to an ISDN line for TV phone and Internet communications.

The line connecting means functions as a modem and a terminal adapter for implementing data transmission procedures and as tuners for receiving TV, radio and CATV broadcasts.

Usable as the storage device are a RAM, a hard disk, a floppy disk, and a rewritable nonvolatile memory.

The storage device may include a video recorder to be used for recording a received TV broadcast, and a cassette recorder and an MD to be used for recording a received radio broadcast and a voice telephone call.

The storage device stores therein retrieval information such as information entities, media identification data indicative of the locations (media) of the information entities, and data types of the information entities retrieved from the media. The storage device further stores therein various types of data including image data, sound data, graphic data, symbol data and character data in predetermined formats.

FIG. 14 illustrates an exemplary retrieval item screen. A topic headline or a keyword ("NARA TOURIST INFORMATION" in FIG. 14) to be retrieved is inputted as data for "RETRIEVAL ITEM" by means of a keyboard by a user.

Typical media to be connected to the terminal unit are listed in "MEDIA TO BE SEARCHED" in FIG. 14. The media are not limited to those listed in FIG. 14, but any other media may be added thereto.

Where the user selects no medium on the screen shown in FIG. 14, all the media are searched. Where the user selects any of the media, only the selected media are searched.

FIG. 15 illustrates an exemplary screen of a list of retrieval information stored in the storage device. As shown, each retrieval information record includes four data ("MEDIA", "TOPIC", "ACCESS INFORMATION", "BROADCASTING DATE/TIME"). The topic corresponds to the aforesaid information item.

A large quantity of such retrieval information is stored in the storage device, but the screen shown in FIG. 15 contains only retrieval information relevant to the data inputted in "RETRIEVAL ITEM" in FIG. 14. More specifically, when the user inputs data in "RETRIEVAL ITEM" on the screen shown in FIG. 14, retrieval information including data which matches any of character strings contained in the data of the retrieval item is retrieved, and the retrieval results are displayed on the screen as shown in FIG. 15.

The retrieval process is performed by the retrieval controller. More specifically, a CPU performs the retrieval process on the basis of programs stored in a RAM, a ROM and the like.

In each line of the list shown in FIG. 15, information shown in the "TOPIC" column resides on a medium shown in the "MEDIA" column. Data in the "ACCESS INFORMATION" column indicates the location of the information.

For example, the information entitled "EVENTS IN NARA" resides on the Internet, and the access information is represented by an URL. The access information is given by a telephone number for a facsimile or telephone information service and by a channel number for a TV program. In the case of a TV or radio program, broadcasting date/time (broadcasting date, start time, end time) are also included in the retrieval information. The retrieval information is not limited to that shown in FIG. 15, but may include additional or different items.

The retrieval information is stored in the storage device of the combination terminal unit according to the foregoing explanation, but may be stored in any other storage device, for example, in information servers to be connected to the terminal unit via a network. Further, the retrieval information does not necessarily have to be stored in a format as shown in FIG. 15.

Examples of the information server include those owned by service providers on the Internet and PC communications service providers. These information servers may be located remotely from the combination terminal unit of the present invention and connected to the terminal unit via an ordinary telephone line or ISDN.

The information servers retain access information indicative of the location of information, which may be acquired as the retrieval information by the combination terminal unit.

Examples of the access information are Internet home page information, FAX transmission service information, TV program information, ratio program information, CATV program information and personal computer communications service information, which each include a topic headline indicative of the topic of the information and access information (URL, telephone number, channel and forum name).

Where the retrieval information shown in FIG. 15 is stored as it is in the information server, it is merely necessary to connect the terminal unit to the information server by the line connecting means, acquire the retrieval information from the information server by information collector and storing the acquired retrieval information in the storage means. At this time, only retrieval information relevant to the retrieval item shown in FIG. 14, rather than all the retrieval information in the information server, may be acquired from the information server and stored in the storage device from the viewpoint of cost and time saving.

Where the media and the access information are already known when the terminal unit is connected to the information server for information acquisition, only an item corresponding to the "TOPIC", rather than all the retrieval information, may be acquired from the information server and processed into the format shown in FIG. 15 by the CPU of the terminal unit for storage thereof in the storage device.

Usable as the display device are any of various display devices such as CRT, LCD, PDP and FED. The display device displays a retrieval item and media as shown in FIG. 14, a retrieval information list as shown in FIG. 15, setting items, operation items and information received from media.

The display device may be switched from one screen to another or, alternatively, windows are tiled, overlapped, scaled down or up, or moved on the display device as required. The screens shown in FIGS. 14 to 18 are merely illustrative, but not limitative.

The retrieval controller is embodied by causing the CPU to perform retrieval functions on the basis of programs stored in a storage medium such as a RAM, a ROM, a floppy disk or a hard disk.

As described above, when the retrieval item is inputted on the screen shown in FIG. 14, retrieval information relevant to the retrieval item is read out of the storage device, and displayed in the tabular format on the display device.

When a user selects particular retrieval information with the retrieval information list being displayed as shown in FIG. 15, the retrieval controller operates for connection to a medium on which the particular retrieval information resides.

More specifically, the retrieval controlling means actuates the line connecting means to access a location of the retrieval information indicated by the access information. Where the selected retrieval information resides on the Internet, for example, the retrieval controller boots up Internet brawser software, establishes a line connection to an Internet connection service company, and transmits an URL indicated by the access information to the service company to call up a desired home page.

Where the particular retrieval information is FAX information, the retrieval controller boots up FAX function software and makes a call to a FAX information service company indicated by the access information. After making a necessary setting or transmitting a necessary command, if any, the retrieval controller receives desired FAX information and outputs the FAX information on the display device or on a printer.

Where the particular retrieval information is a TV broadcast program, the retrieval controller automatically tunes to a channel indicated by the access information by means of a tuner, and displays the TV program of the channel on the display device. If broadcasting date/time is also specified, this process sequence may be performed only at the specified date/time. The TV program may be recorded by storage device such as a video recorder instead of being displayed.

In the case of other media, the retrieval controller performs a line connecting operation in the same manner as described above for connection to a location of desired information indicated by the access information, and displays or stores the information. The aforesaid process sequences are routine, which vary depending on the media, and performed on the basis of programs stored in a storage medium such as a RAM or a ROM.

With the means and functions described above, the user can access desired information without considering the location of the information. Thus, the operability of the combination terminal unit can be improved by alleviating the burden on the user for information retrieval.

In accordance with the present invention, the combination terminal unit further includes scheduler for preliminarily specifying schedule information for establishing a line connection to a location of a predetermined information entity at a time designated by the inputting device, rejection period storage memory for storing therein a line connection rejection period, and line connection rejecting means for, if a current time is in the midst of the line connection rejection period immediately before the time specified in the schedule information by the scheduler, rejecting any line connection other than the line connection based on the schedule information specified by the scheduler.

The scheduler corresponds to means for so-called video recording scheduling. The scheduler specifies a location of desired information, a period or time at which the user wishes to start checking the information, and the like. The schedule information includes, for example, the topic of the information, the access information and the scheduled date/time. The schedule information is stored in rewritable storage means such as a RAM.

The retrieval controller constantly checks for presence of any schedule information specified by the scheduler and, if schedule information is present, performs the aforesaid process sequence for the line connection and information acquisition in accordance with the schedule information.

A rewritable memory such as a RAM or a hard disk is used as the rejection period storage memory. The line connection rejection period to be stored in the memory is a predetermined period before the start time of the scheduled information reception specified in the schedule information. During this period, the line connection process is not performed even if the user inputs a line connection request.

Where the line connection rejection period is 2 minutes and the scheduled start time is 10:00, the line connection request from the user is rejected during a period from 9:58 to 10:00.

Line connection requests other than that based on the schedule information, rather than all the line connection requests, may be rejected. Further, the rejection of the line connection requests may occur not only during the line connection rejection period immediately before the scheduled start time but also after the start time.

The line connection rejection circuit is embodied by causing the CPU to perform the line connection rejection process on the basis of predetermined programs stored in the storage medium.

The line connection rejection during the predetermined period immediately before the scheduled start time prevents plural line connection operations from conflicting with each other after the start time.

FIG. 16 illustrates an exemplary alert screen for a scheduled TV program. In FIG. 16, a TV phone dialing screen is shown on the left, and the alert screen is shown on the right. When the user issues a TV phone line connection request, for example, the alert screen is displayed to inform that a scheduled TV program will start in two minutes.

The line connection request during the line connection rejection period is not promptly rejected, but the alert screen is displayed for more user-friendly operation.

The combination terminal unit may further include a function or means for permitting a line connection to a particular medium even during the line connection rejection period immediately before the scheduled start time.

More specifically, the combination terminal unit may further have restriction period storage memory for storing therein a line connection restriction period, so that only a line connection to the particular medium is permitted during the restriction period immediately before the predetermined time. The terminal unit may be adapted to permit only a line connection for reception of particular information from any of various media, rather than a line connection to the particular medium.

The provision of such means allows the user to obtain urgent information with a high priority.

It is preferred that the user can specify or change the medium to be permitted a line connection. For example, a voice telephone call may always be permitted to be received with a high priority, or a voice telephone call from a particular calling party may be permitted to be received with a high priority.

When the line connection to the particular medium is permitted, only the information from the medium may be displayed on the display device by interrupting the displaying of previous information.

The combination terminal unit may further include split display controller for, when a line connection for reception of urgent information is permitted, simultaneously split-displaying the previous information and the urgent information on the display device.

Figure 17:
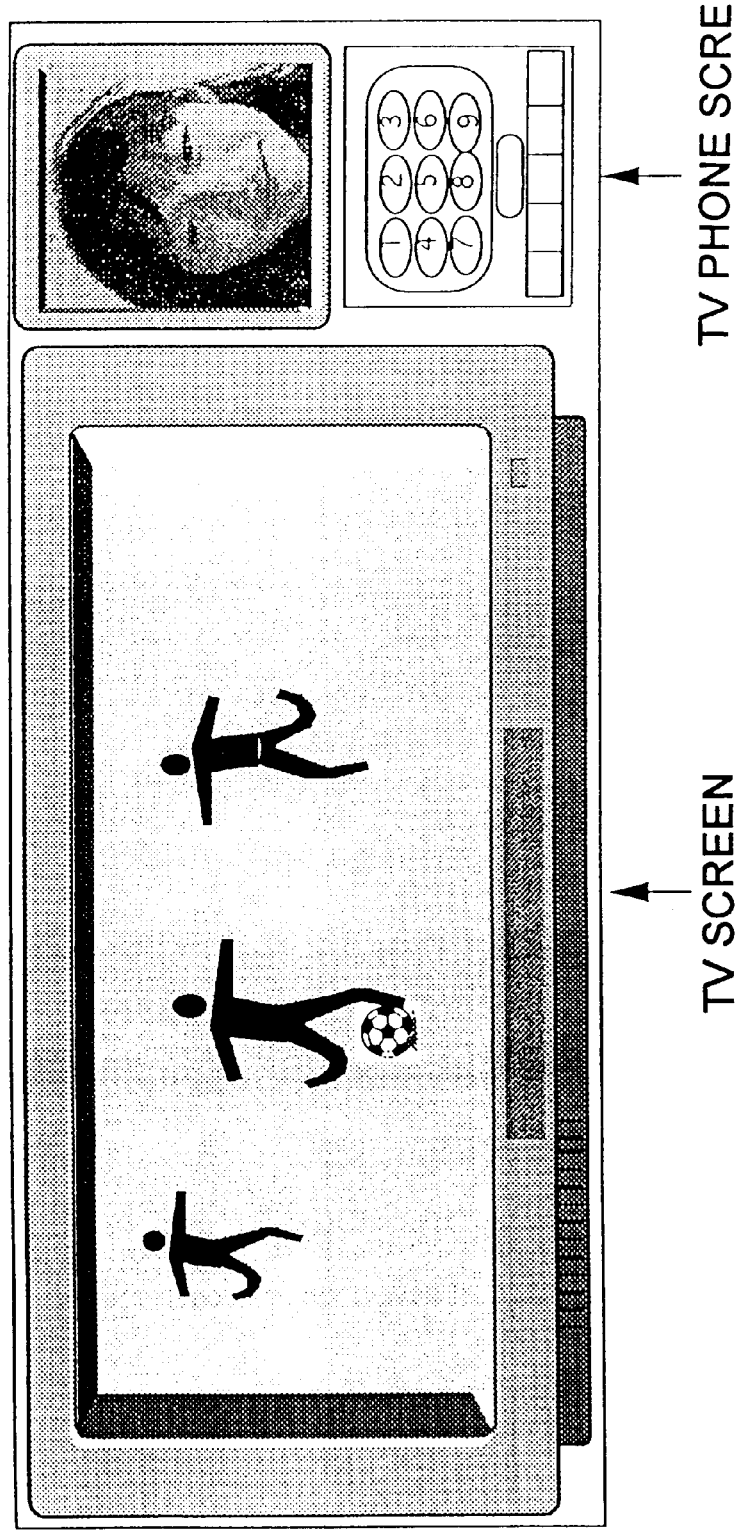
FIG. 17 illustrates an exemplary split screen.

FIG. 17 illustrates a TV broadcasting screen and a TV phone screen split-displayed on the display device. The split displaying allows the user to view the urgent information as well as the previous information simultaneously displayed on the display device for smooth response to the information. The display device may be designed to allow the user to determined which displaying method, i.e., the split displaying method or the switch displaying method, is to be employed for the display of the urgent information.

The combination terminal unit may further include actuation setting means for preliminarily specifying the actuation date/time and conditions for actuating the line connection rejection function, the line connection permission function and the split display function (or the deactivation date/time and conditions for deactivating these functions). This prevents missing of important information and interruption of viewing of the important information.

Further, information entities to be inputted to the combination terminal unit may respectively be assigned priorities. More specifically, information reception priorities are assigned to a plurality of available information entities. If a higher priority information entity is received, for example, during the display of another information entity, the higher priority information entity is displayed by interrupting the displaying of the another information entity.

Conversely, if a lower priority information entity is received during the display of another information entity, the reception of the lower priority information entity is rejected. Alternatively, the lower priority information entity may be received and stored in the storage device instead of being displayed on the display device. The priorities of the information entities may be stored in a storage medium such as a RAM or a hard disk.

The combination terminal unit may further include attendance condition specifying circuit for specifying attendance information indicative of attendance or unattendance of a user and information processing conditions in a user attended situation and in a user unattended situation. For easier operation and prevention of mode setting failure, it is preferred that, once the attendance information (i.e., user attendance or user unattendance) is specified in the combination terminal unit, the attendance information and the information processing conditions specified by the attendance condition specifying circuit are put in effect for handling of all information.

The combination terminal unit may further include schedule display controller for, if schedule information specified by the scheduler is present, displaying the schedule information on the display device. The schedule information thus displayed on the display device prevents needless duplication of information inputs, and alerts the user.

Figure 18:
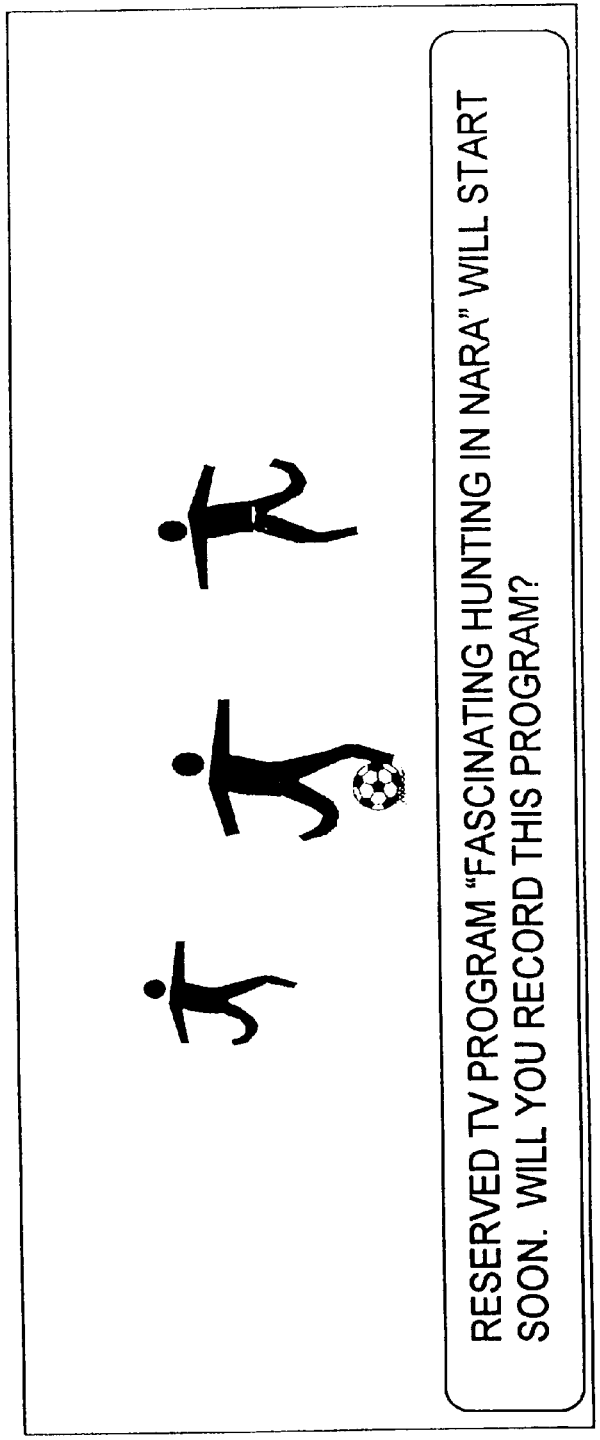
FIG. 18 illustrates an exemplary screen delivering a message of schedule information.

For example, a message for the schedule information can be displayed as shown in FIG. 18 the predetermined period before the line connection to a medium. This prevents the user from performing an unnecessary operation, and ensures more user-friendly operations.

A message to be displayed is not limited to that shown in FIG. 18, but any of various messages including contents of the schedule information and the type of the medium may be displayed on the display device. It is preferred that the messages to be displayed are prepared or preliminarily registered by the user.

The functions of the aforesaid means are performed on the basis of programs stored in the storage device.

Examples of the storage device for storing therein the programs include memories such as a ROM and a RAM incorporated in the combination terminal unit, and portable memories such as a hard disk, a floppy disk, a CD-ROM, a removable HD and an MO. Alternatively, the programs may be stored in storage devices of computers, such as servers of program providers, which are located remotely from the combination terminal unit and, as required, down-loaded to the terminal unit through communication lines.

With reference to the attached drawings, the present invention will hereinafter be described in detail by way of an embodiment thereof. However, it should be understood that the embodiment is not limitative of the invention.

FIG. 1 is a block diagram illustrating the basic construction of a combination terminal unit according to one embodiment of the present invention.

In FIG. 1, a central processing unit (CPU) 2-1 controls the overall combination terminal unit, and programs for controlling the CPU are stored in a ROM 2-24.

A telephone line controlling section 2-2 controls connection to a telephone line and an ISDN line and transmission of data to be inputted from and outputted to telephones, facsimiles, personal computers and Internet through the lines. A modem or terminal adapter (TA) 2-3 modulates and demodulates data inputted or outputted through the telephone line controlling section 2-2.

A TV phone controlling section 2-8 controls image and sound data for a TV phone. A TV tuner 2-4 receives a TV broadcast. A CATV tuner 2-5 receives a cable television (CATV) broadcast. A cable modem 2-6 processes Internet data and the like transmitted by a cable television station. A radio tuner 2-7 receives radio signals.

Selectors 2-9, 2-12, 2-16 and 2-18 each select sound data, image data and other data obtained through the modem, the TV phone controlling section and the tuners. A display controlling section 2-11 controls data signals selected by the selectors, and displays images on a display device 2-12 in a split or overlapped manner. A sound controlling section 2-14 controls sound data, which is outputted from a speaker 2-15.

An image/sound storage device 2-17 stores therein image and sound data, and a sound storage device 2-19 stores therein sound data. An inputting device 2-21 allows a user to input an instruction and the like. For example, a keyboard and a touch panel are used as the inputting device. A clock 2-22 keeps time in the combination terminal unit. An outputting device 2-25 outputs acquired data. For example, a printer is used as the outputting device.

An external storage device 2-26 such as a hard disk stores therein acquired data. A RAM 2-23 temporarily stores therein data for controlling the combination terminal unit. A camera 2-10 is used for image pick-up when a TV phone call is made.

A server 2-20 resides on a network such as the Internet, and serves as a database which is to be connected to the combination terminal unit via a telephone line.

Operations of the combination terminal unit according to the present invention will hereinafter be described with reference to flow charts shown in the attached drawings.

Figure 2A:
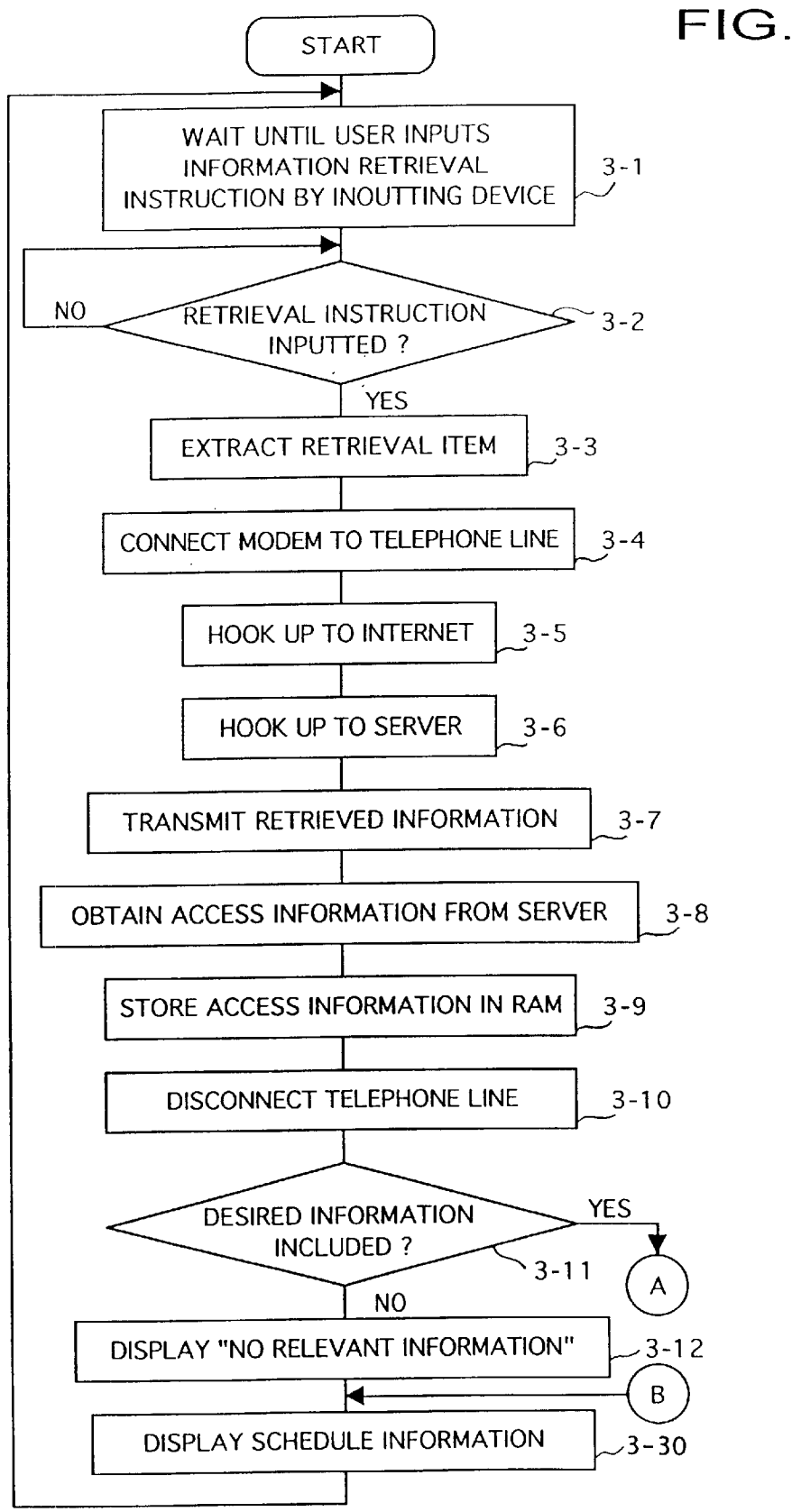
FIGS. 2A and 2B are a flow chart for explaining an information access function according to the present invention.
Figure 2B:
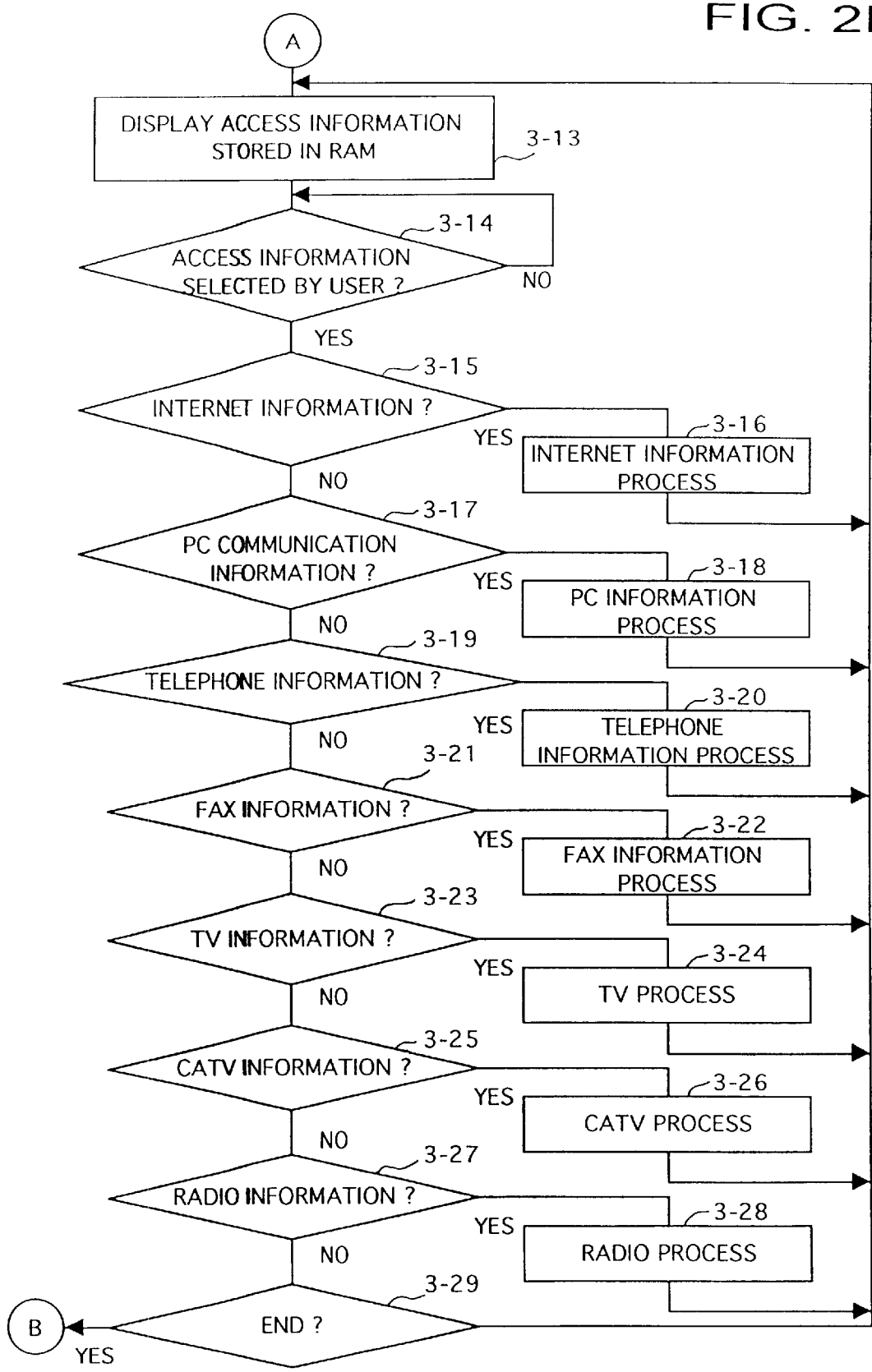

FIGS. 2A and 2B are a flow chart for explaining information acquisition functions which are actuated by information retrieval instructions from a user. These functions are implemented by the CPU 2-1.

The CPU waits until the user inputs an information retrieval instruction by the inputting device 2-21 (S 3-1) and, if the user inputs the retrieval instruction (S3-2), a retrieval item is extracted from the retrieval instruction (S3-3). Then, the modem is connected to the telephone line (S4-4) to hook up to the Internet (S3-5).

The server 2-20 on the Internet retrieves information relevant to the retrieval item specified by the user from a database in the server 2-20 (S3-6), and transmits the retrieved information to the combination terminal unit (S3-7, S3-8).

The CPU 2-1 picks up access information from the transmitted information and stores it in a access information table (FIG. 3) in the RAM 2-23 (S3-9), and then causes the telephone line controlling section 2-2 to disconnect the telephone line (S3-10).

The user checks the retrieved information and, if desired information is not included in the retrieved information (S3-11), a message "NO RELEVANT INFORMATION" is displayed in response to a user's instruction (S3-12). Where a video or television program schedule has been inputted, schedule information is displayed (S3-30).

The schedule information is stored in the form of a schedule table as shown in FIG. 4 in the RAM 2-23. The displaying of the schedule information prevents the user from inputting duplicate information.

If the desired information is included in the retrieved information (S3-11), the CPU displays the access information transmitted from the server (S3-13), and prompts the user to select the desired information (S3-14). In response to a user's instruction, the CPU performs an operation for the selected information (S3-15 to S3-27).

If the user inputs an end instruction (S3-29), the schedule information is displayed (S3-30), and then the process returns to Step S3-1 to wait for the next retrieval information input.

Since the user can select the desired information while viewing the access information as shown in FIG. 3, the user can access the desired information without considering the location (medium) of the desired information.

Figure 7A:
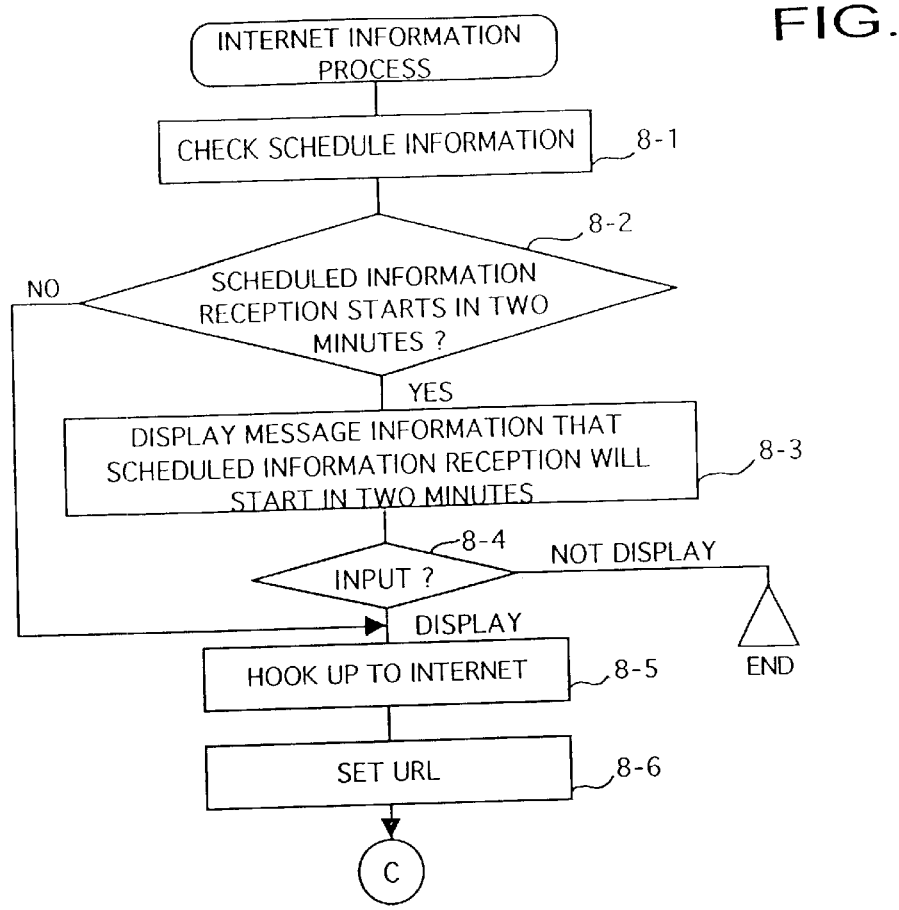
FIGS. 7A and 7B are a flow chart for explaining an Internet information process.
Figure 7B:
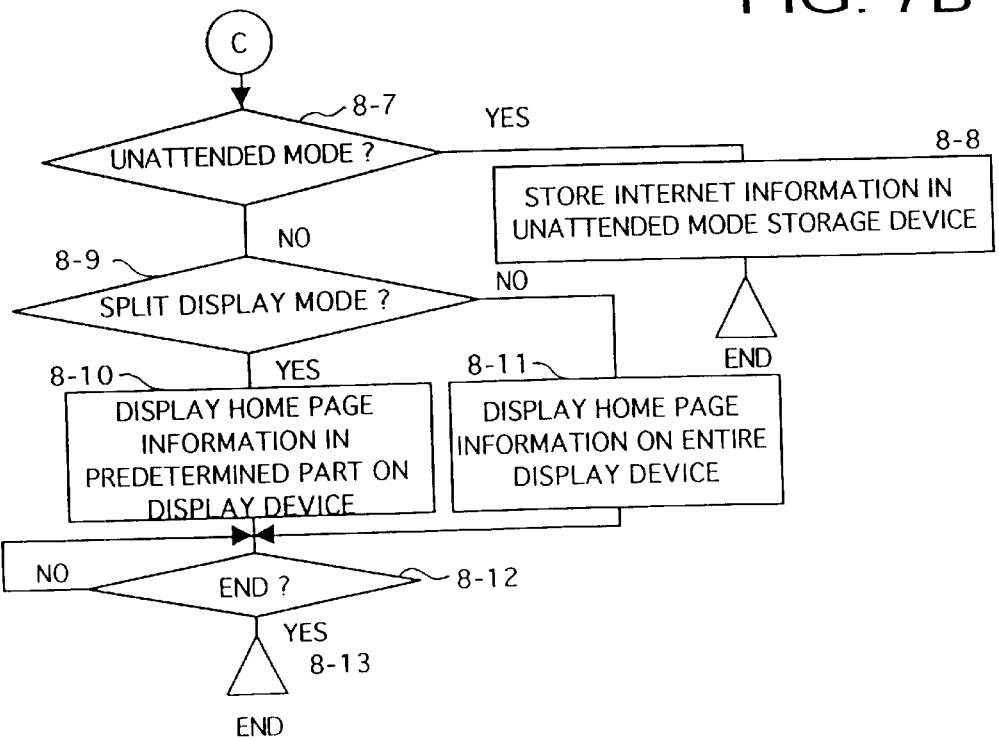

FIGS. 7A and 7B are a flow chart for explaining an Internet information process (S3-16) to be performed where the information selected by the user resides on the Internet.

In this process, the CPU establishes a line connection to the Internet (S8-5) and displays the information on the display device 2-12 (S8-10, S8-11). However, the following pre-process is performed before the Internet information process.

Where a scheduled TV program is to start in about two minutes, for example, the Internet information may conflict with the TV broadcast on the display device. A situation that the user has not intended may occur.

To prevent such a situation, the schedule information is checked (S8-1). The date/time data in the schedule table shown in FIG. 4 is compared with the current time indicated by the clock 2-22 and, if the scheduled broadcast program is to start in two minutes (S8-1, S8-2), the user is allowed to determine whether or not the scheduled broadcast program is to be displayed (S8-3). If the scheduled broadcast program is to be displayed, the Internet information process is interrupted with the Internet information not displayed (S8-4). The period is not limited to two minutes, but may be set or changed by the user as required.

If no schedule information is present or if schedule information for media other than the Internet is present but the user wishes to view the Internet information, the CPU establishes a line connection to the Internet (S8-5).

The user selects a desired Internet home page while viewing the access information table (FIG. 3). In response thereto, an URL for the home page is extracted from the access information table and transmitted to the Internet through the telephone line. Thus, the terminal unit is hooked up to the desired home page (S8-5, S8-6).

Where the combination terminal unit is in an unattended mode (S8-7), the information contained in the home page is stored in a storage medium preliminarily specified in an unattended mode storage device table (see FIG. 5). The Internet information is stored, for example, in a HDD (S8-8).

Where the terminal unit is not in the unattended mode, the CPU checks whether or not the terminal unit is in a split display mode (S8-9). If the terminal unit is in the split display mode, the CPU causes the display controlling section 2-11 to display the information of the home page in a predetermined part of the display device (S8-10). If the terminal unit is not in the split display mode, the information of the home page is displayed on the entire display device (S8-11). When the user inputs an end instruction after viewing the information (S8-12), the process ends (S8-13) and a data selection screen is displayed (S3-13, S3-14).

Where the displaying of the information scheduled to be received is to start in the predetermined period before the start of the Internet information process in Step S8-4, the Internet information process is not started so that plural information inputs are prevented from conflicting with each other.

The setting of the unattended mode is achieved by allowing the user to input a predetermined instruction on the screen.

The unattended mode may be set selectively for respective information entities to be inputted to the terminal unit. For easier operation and prevention of mode setting failure, it is preferred to set the unattended mode of the combination terminal unit for reception of all incoming information entities.

Where the terminal unit is in the unattended mode, it is preferred that unattended mode storage device setting information as shown in FIG. 5 is stored in the hard disk or RAM 2-23 in consideration of the properties of information entities to be inputted from the respective media. This arrangement allows the user to perform a proper operation when the terminal unit is later put in an attended mode.

Figure 8A:
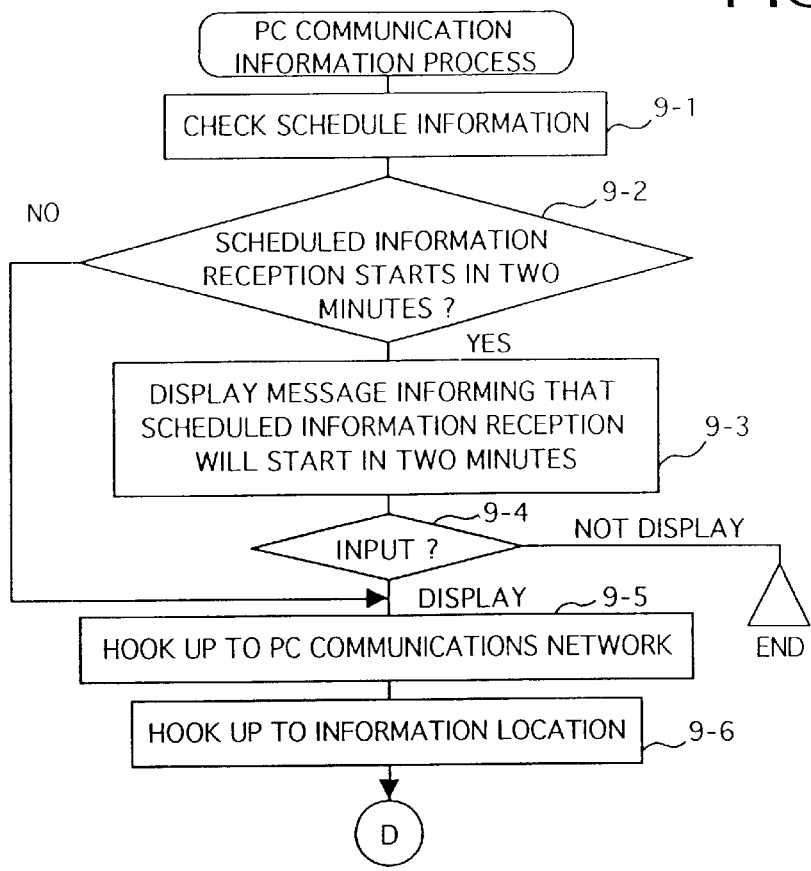
FIGS. 8A and 8B are a flow chart for explaining a PC information process.
Figure 8B:
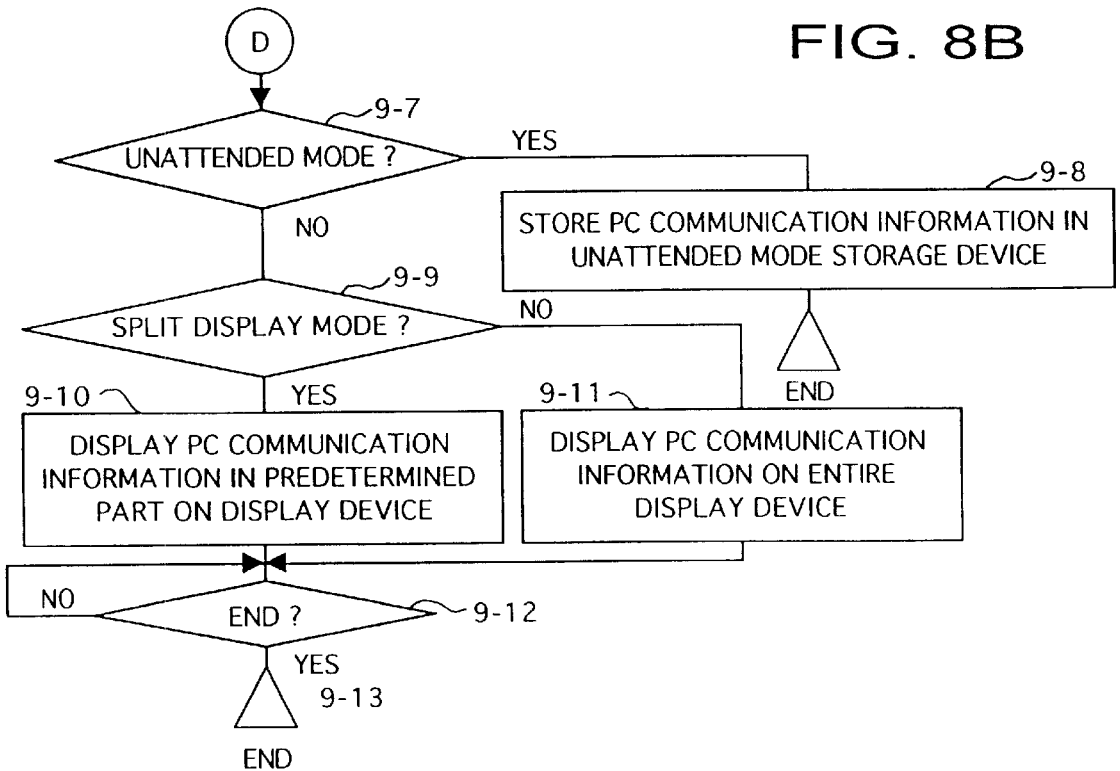

FIGS. 8A and 8B are a flow chart for explaining a PC information process (S3-18) to be performed where the information selected by the user resides on the PC communications network. This process is performed in substantially the same manner as the Internet information process, except that the media to be connected to the terminal unit is a PC communications network.

Figure 9A:
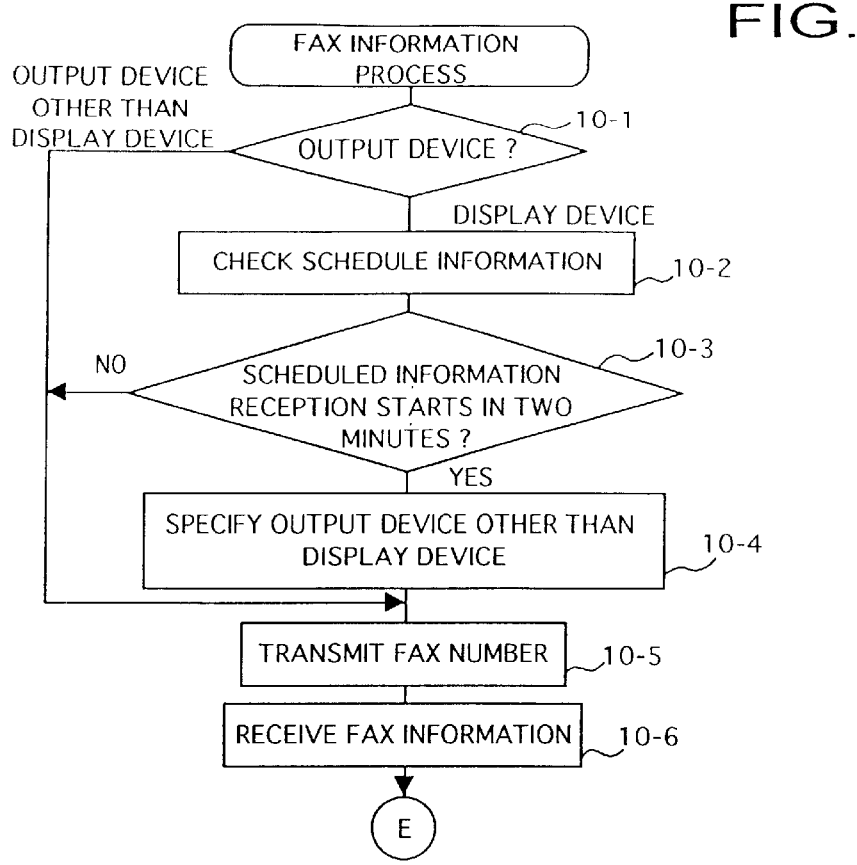
FIGS. 9A and 9B are a flow chart for explaining a FAX information process.
Figure 9B:
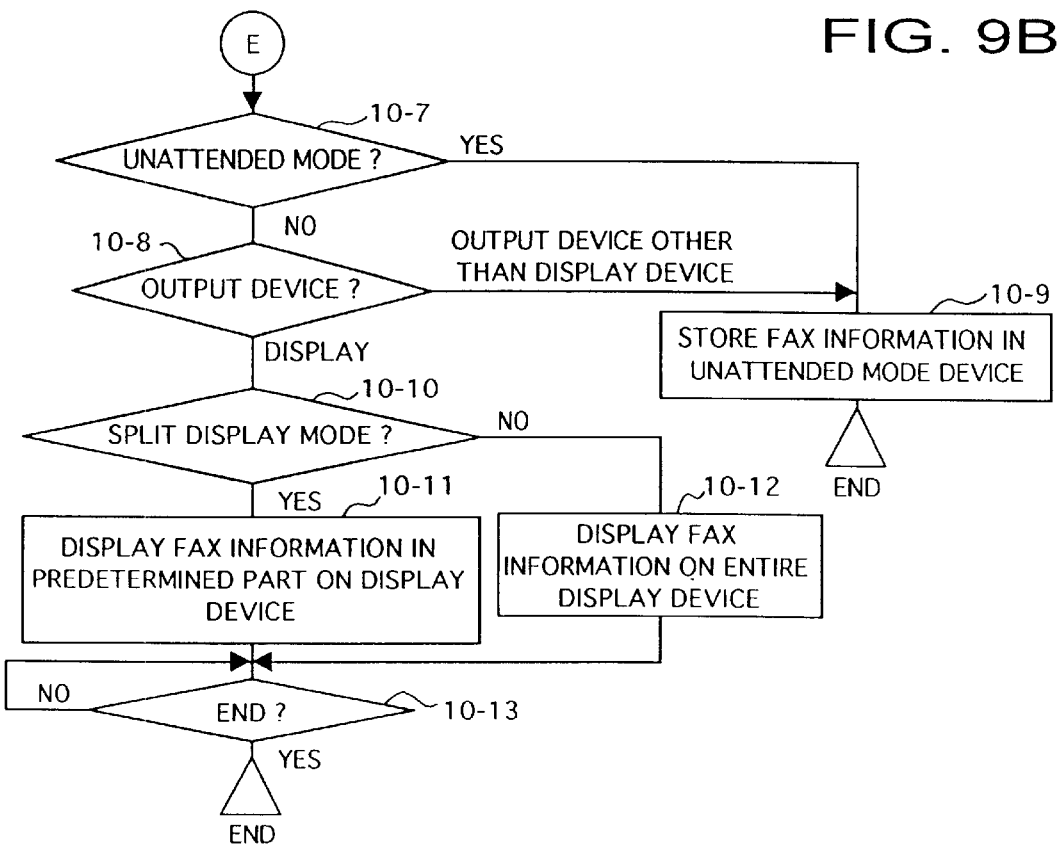

FIGS. 9A and 9B are a flow chart for explaining a FAX information process (S3-22) to be performed where the information selected by the user is FAX information.

The FAX information is generally outputted on the outputting device 2-25 such as a printer. Alternatively, the FAX information may be outputted on the display device 2-12 or stored in the image/sound storage device 2-17 or the external storage device 2-26. Therefore, it is preferred that the user preliminarily specifies a device on which the FAX information is outputted (see FIG. 5).

When the user selects the FAX information, the FAX information process shown in FIGS. 9A and 9B are started. Where "DISPLAY" is selected as the output device (S10-1), the CPU checks for presence of any schedule information (S10-2). Where scheduled information reception (e.g., scheduled TV broadcast program) is to start in two minutes, there is a possibility that the transmitted FAX information (like the Internet information) may conflict with the TV broadcast program on the display device. Therefore, an output device other than the display device (e.g., printer) is automatically selected for outputting the FAX information (S10-4).

Even if the FAX information arrives during the scheduled information reception (e.g., TV broadcast program), the FAX information can be received without interrupting the display of the received information. The period is not limited to two minutes, but may be set or changed as required by the user.

A FAX number of a FAX information service company which provides the desired FAX information is transmitted for acquisition of the FAX information (S10-5, S10-6). Where the combination terminal unit is in the unattended mode or a device other than the display device is selected as the output device (S10-7, S10-8), unattended mode setting device data is stored (S10-9). In accordance with the unattended mode device table shown in FIG. 5, the obtained FAX information is outputted on the printer.

Where the display device is selected as the output device and the terminal unit is not in the unattended mode, the FAX information is displayed on a split screen of the display device or on the entire display device (S10-10, S10-11, S10-12), depending on whether or not the split display mode is selected. The process ends in response to an end instruction inputted by the user after the user checks the FAX information displayed on the display device (S10-13).

Figure 10A:
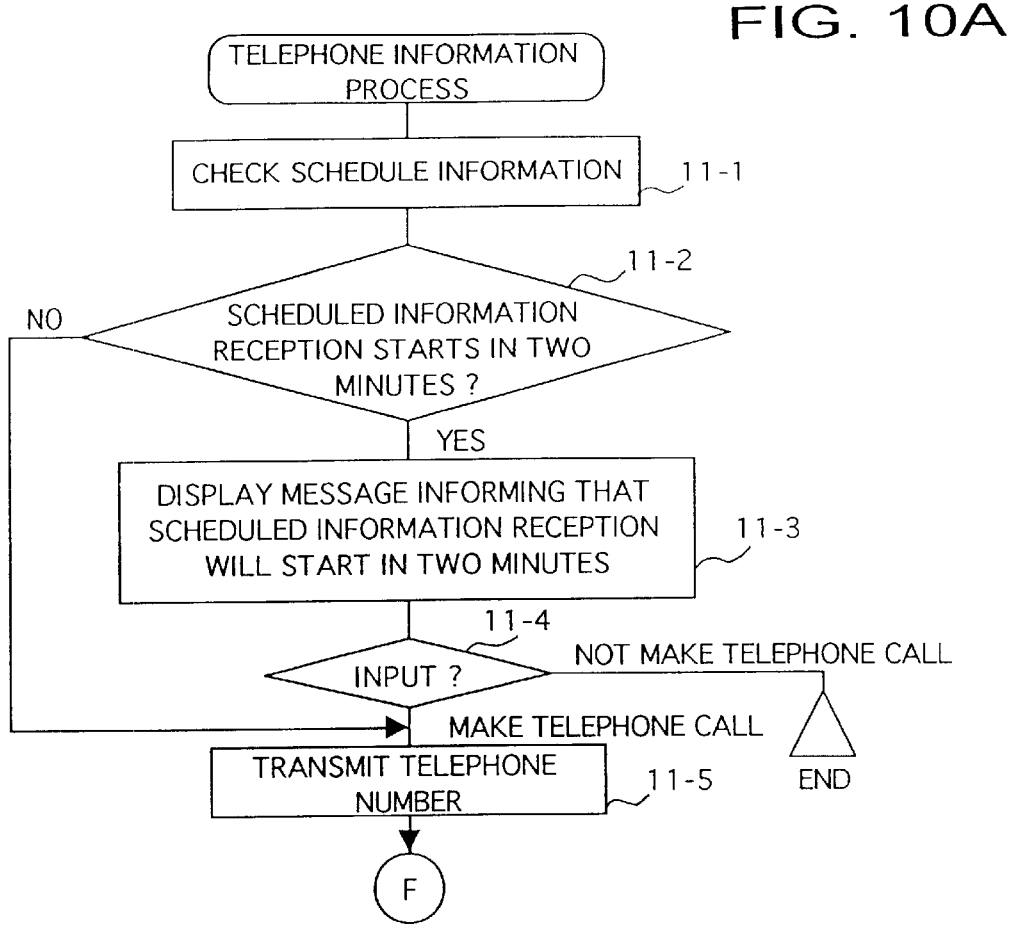
FIGS. 10A and 10B are a flow chart for explaining a telephone information process.
Figure 10B:
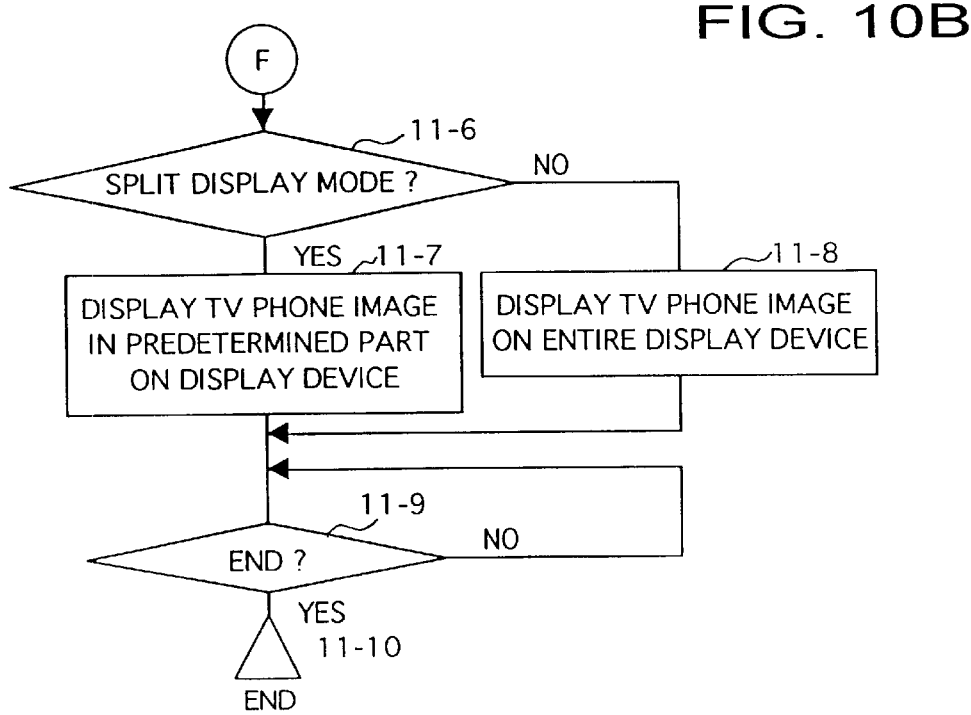

FIGS. 10A and 10B are a flow chart for explaining a telephone information process (S3-20) to be performed where the information selected by the user is TV phone information. As in the Internet information process and the PC communication process, the CPU checks for presence of any schedule information (S11-1). If schedule information is present, the CPU waits until the user inputs a telephone request (S11-2 to S11-4). Where the user is to make a phone call, the CPU causes the telephone line controlling section 2-2 to transmit a telephone number (S11-5). Then, the CPU checks whether or not the terminal unit is in the split display mode, and a TV phone image is displayed on a split screen of the display device or on the entire display device (S11-6 to S11-8). In response to an end instruction inputted by the user, the process ends (S11-9 and S11-10), and then the next information selection screen is displayed.

Figure 11A:
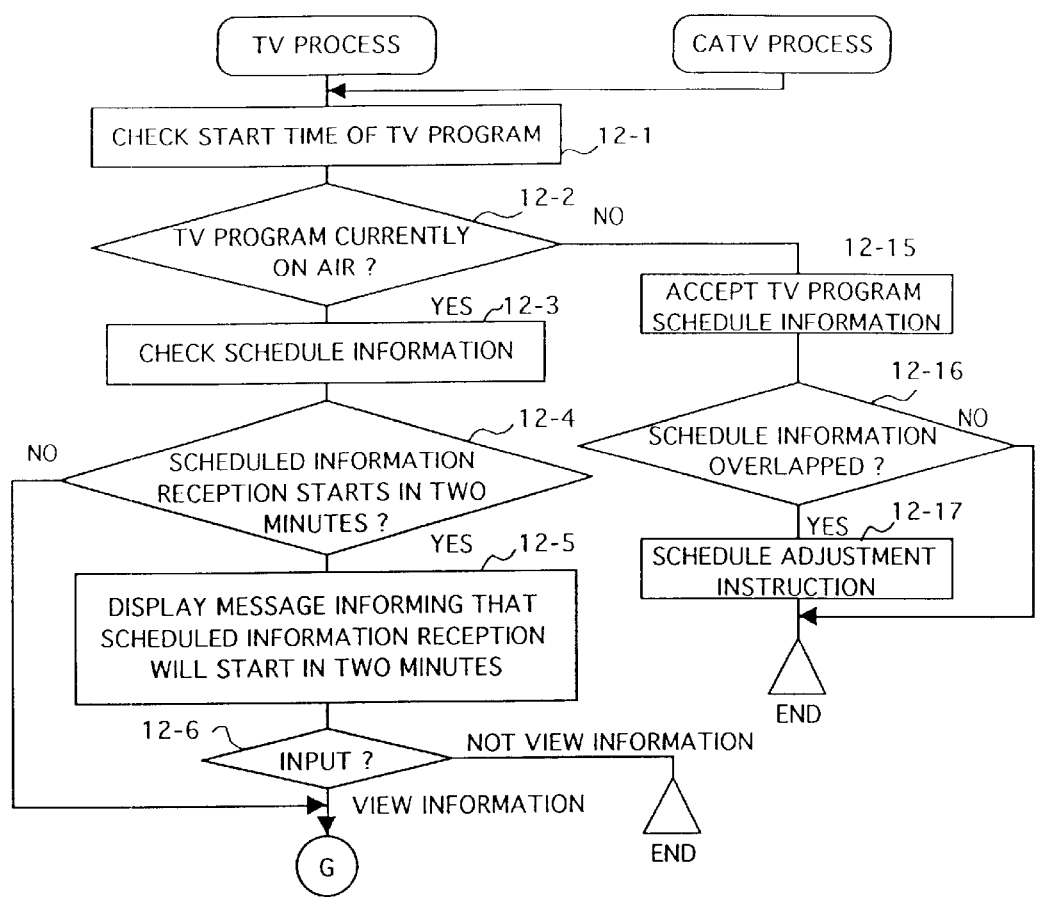
FIGS. 11A and 11B are a flow chart for explaining a TV/CATV process.
Figure 11B:
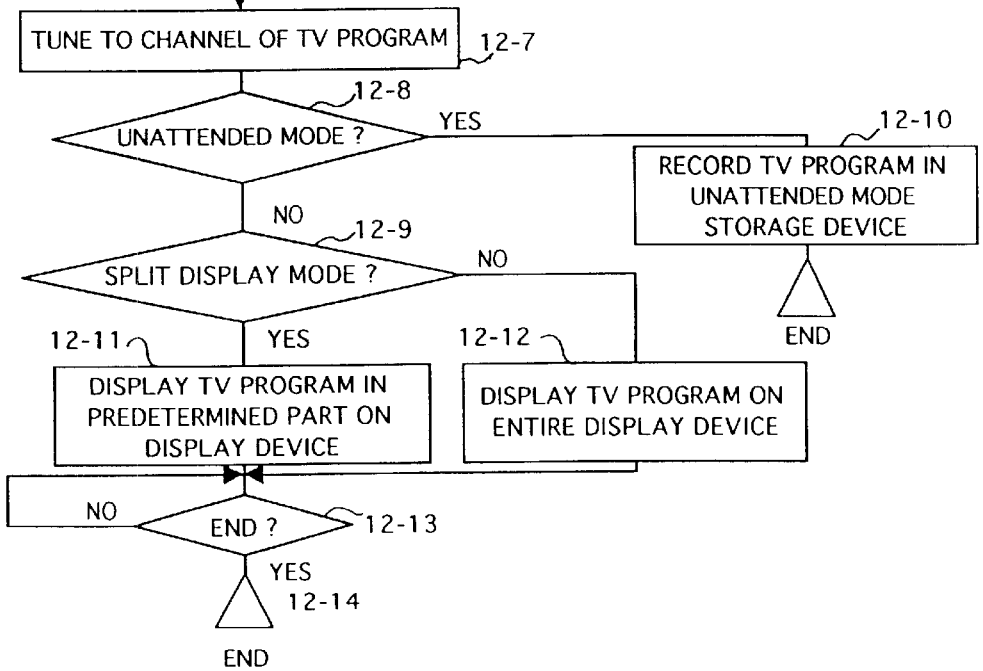

FIGS. 11A and 11B are a flow chart for explaining a TV process (S3-24) and a CATV process (S3-26) to be performed where the information selected by the user is TV information or CATV information. First, the CPU checks whether or not the selected TV or CATV program is on air, by comparing the start time of the program with the current time indicated by the clock 2-22 (S12-1, S12-2).

If the TV or CATV program is now on air, the CPU checks for presence of any schedule information (S12-3, S12-4). If a scheduled broadcast program starts in two minutes, the CPU allows the user to determine whether or not the scheduled program is to be displayed on the display device (S12-5). If the user wishes to view the scheduled program, the CPU causes the TV tuner or the CATV tuner to tune to a designated channel (S12-7).

Where the terminal unit is in the unattended mode, the broadcast program is recorded in a designated device, e.g., in a video recorder in accordance with the unattended mode storage device table shown in FIG. 5 (S12-10). Where the terminal unit is not in the unattended mode, the broadcast program is displayed on a split screen of the display device or on the entire display device, depending on whether or not the split display mode is selected (S12-9, S12-11, S12-12).

If the TV or CATV program is not on air (S12-2), the CPU stores the TV or CATV information selected by the user in the schedule table (FIG. 4) as schedule information, and causes the TV or CATV tuner to tune to the channel of the program (S12-15) so that the TV or CATV tuner can be turned on at the TV program start time. If the schedule information thus stored is overlapped with previously stored schedule information, the CPU alerts the user to the duplication of the schedule information (or gives a schedule adjustment instruction to the user) and prompts the user for input (S12-16, S12-17).

Figure 12A:
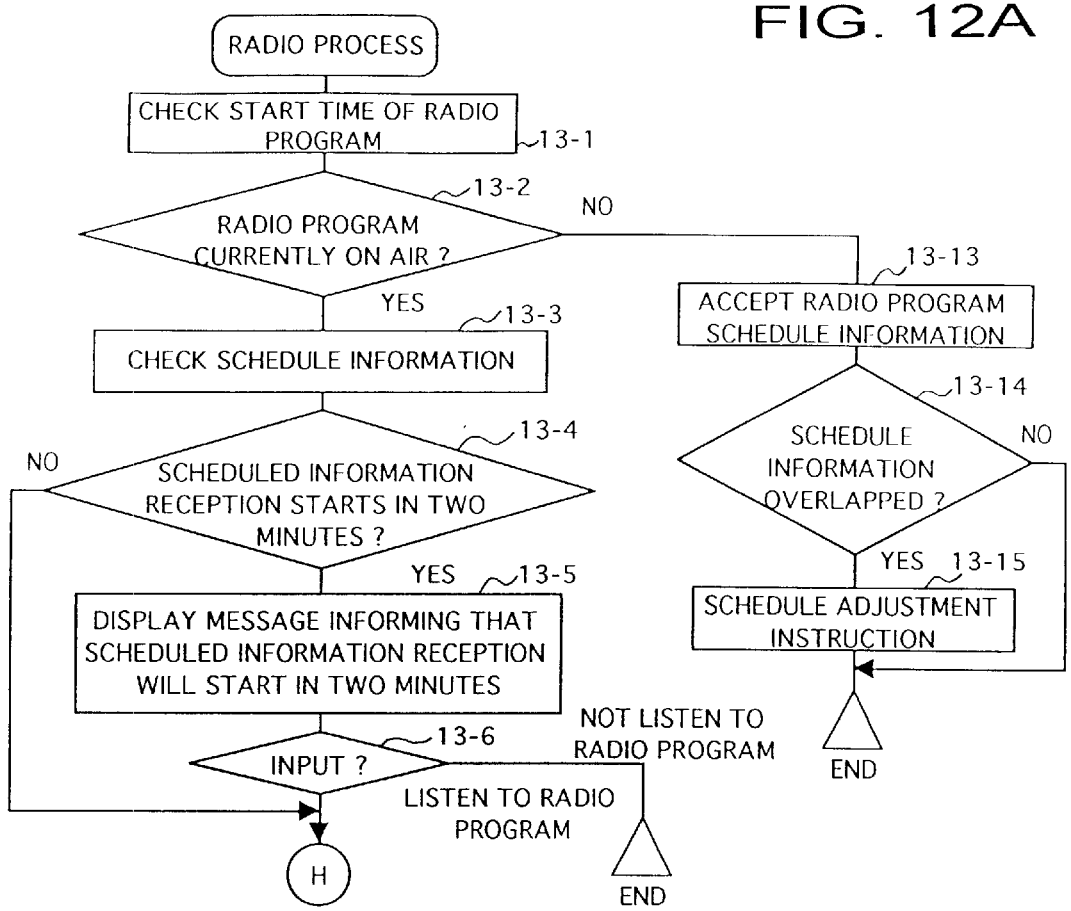
FIGS. 12A and 12B are a flow chart for explaining a radio process.
Figure 12B:
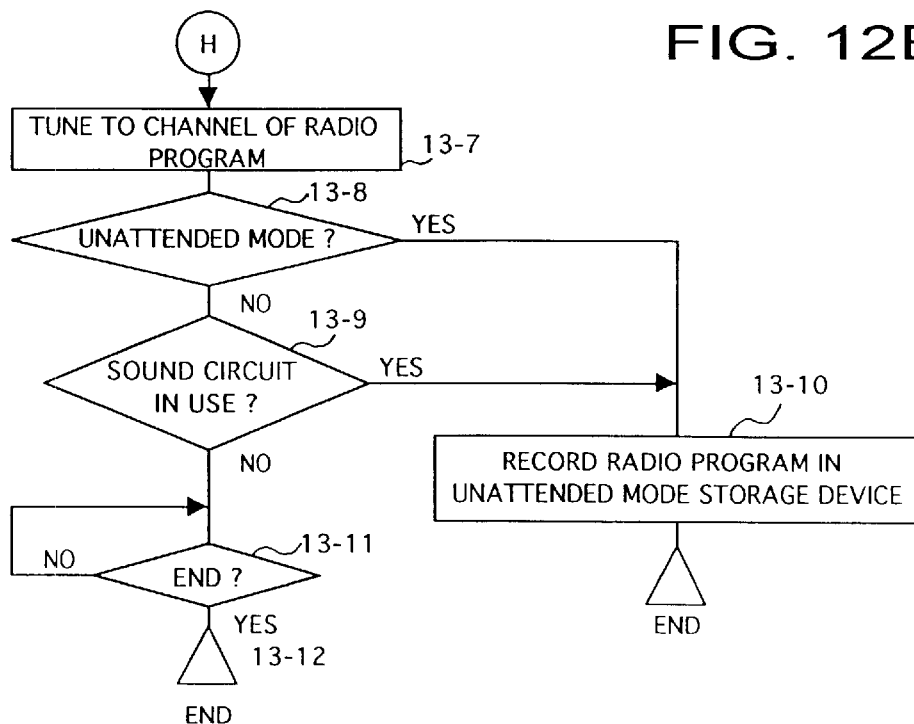

FIGS. 12A and 12B are a flow chart for explaining a radio process (S3-28). In this process, a process sequence from S13-1 to S13-5 is the same as in the TV process described above. The CPU checks whether or not a radio program selected by the user is on air. If the radio program is on air, the CPU checks for presence of any schedule information, and asks the user if he or she wants to listen to the radio program.

Where the terminal unit is in the unattended mode, the radio program is recorded in an unattended mode storage device (e.g., an MD in accordance with the unattended mode storage device table shown in FIG. 5) (S13-1 to S13-11).

Figure 13A:
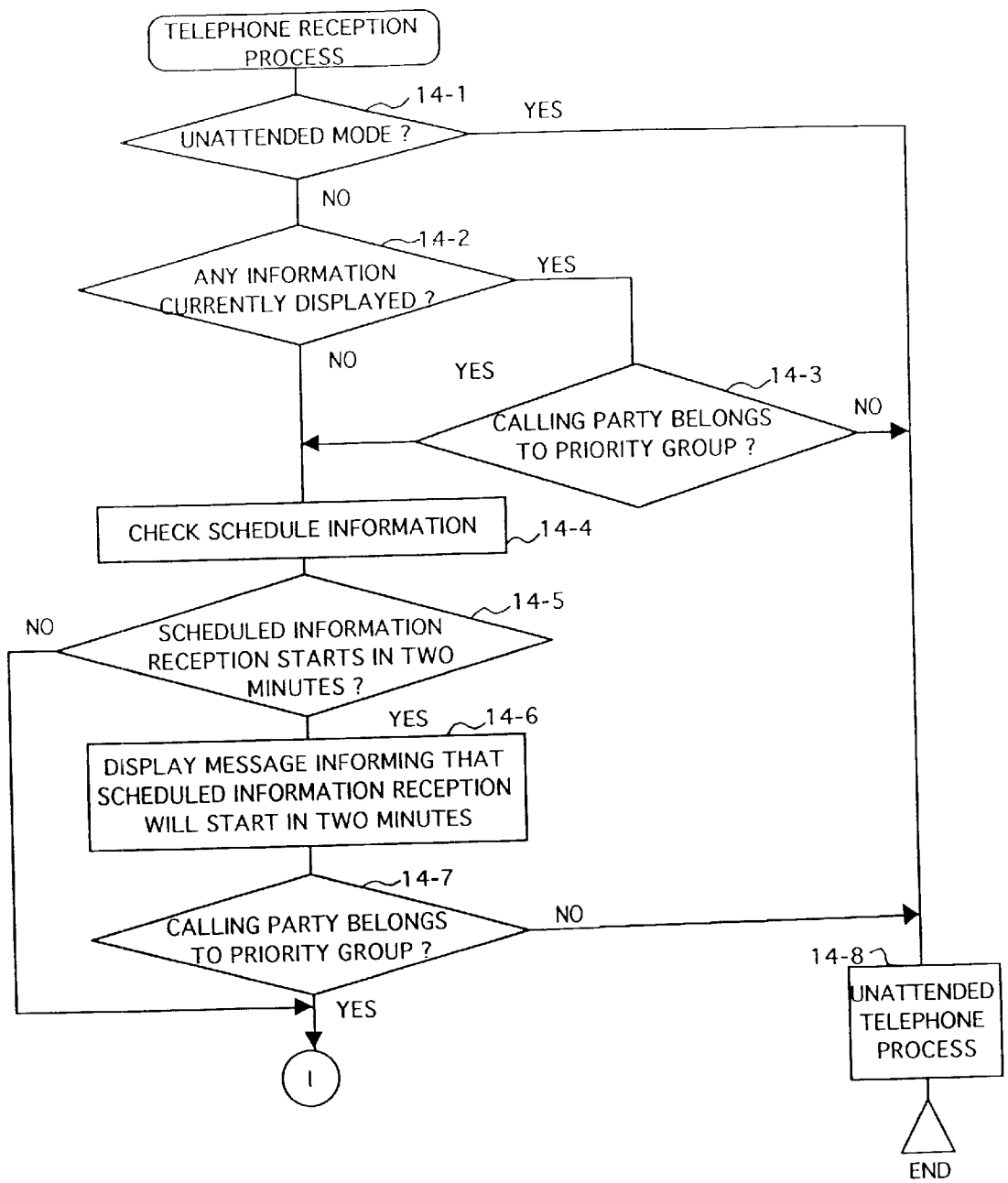
FIGS. 13A and 13B are a flow chart for explaining a telephone call reception process.
Figure 13B:
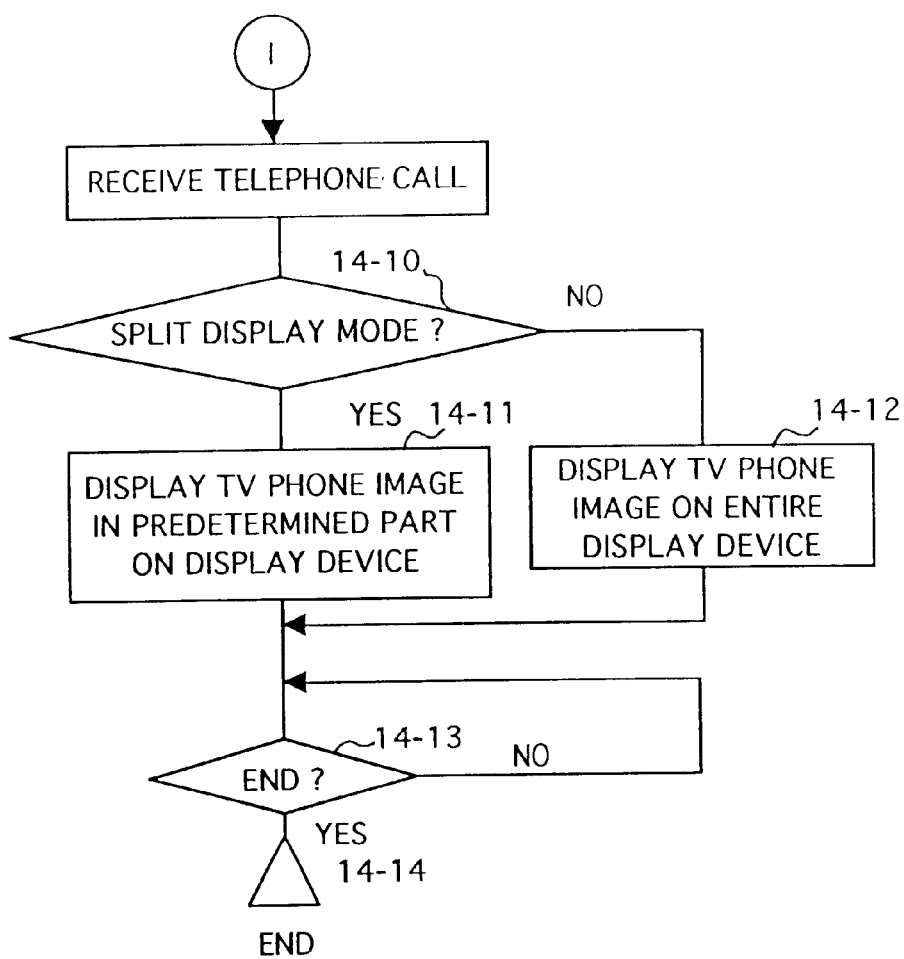

FIGS. 13A and 13B are a flow chart for explaining a telephone call reception process. This process may be performed as an interruption process when a telephone call is received.

The CPU first checks whether or not the terminal unit is in the unattended mode. If the terminal unit is in the unattended mode (S14-1), a message from a calling party is recorded in a specified storage device (e.g., an MD in accordance with the unattended mode storage device table shown in FIG. 5) (S14-8).

Figure 6:
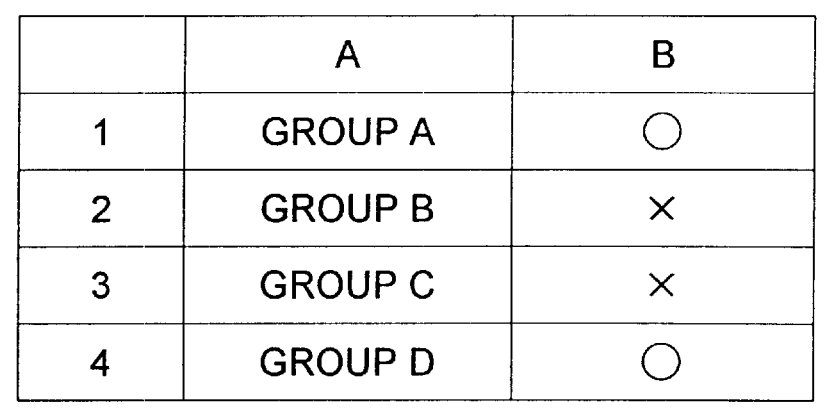

If the terminal unit is not in the unattended mode, the CPU checks whether or not any information is currently displayed on the display device (S14-2). If information is currently displayed on the display device, the CPU acquires the telephone number of the calling party from an exchanger through its calling party identification function. Then, the CPU checks whether or not the calling party belongs to a high priority group in a telephone directory database stored in the RAM and whether or not the high priority group is a predetermined high priority telephone reception group (see FIG. 6) (S14-3).

If the calling party does not belong to the high priority telephone reception group, the telephone call is subjected to an unattended telephone process (S14-8) because the telephone call may hinder the user from viewing the currently displayed information. Where the calling party belongs to a high priority group (including close friends and the like), the CPU checks for presence of any schedule information (S14-4, S14-5) and, if any, displays a message indicative of the presence of the schedule information (S14-6). If the calling party does not belong to the high priority group (S14-7) and no information is currently displayed on the display device but schedule information is present, the telephone call is automatically subjected to the unattended telephone process (S14-8). Therefore, the telephone call does not hinder the user from viewing incoming information.

Otherwise, the telephone call is received (S14-9). If the telephone call is a TV phone call, a TV phone image is displayed on a split screen of the display device or on the entire display device (S14-11, S14-12), depending on whether or not the split display mode is selected (S14-10).

In accordance with the present invention, when a retrieval item is inputted by the inputting device, retrieval information relevant to the retrieval item is read out of the storage device and displayed on the display device. Further, when particular retrieval information is selected from the displayed information by the inputting device, the line connecting means is actuated to establish a line connection to the location of the particular information. This alleviates a burden on the user, and allows the user to readily access desired information through any of a plurality of media without considering the location of the desired information.

Since the information collector can collect information retrieved from remote information servers connected through networks as well as preliminarily stored retrieval information, addition and modification of retrieval information are easy.

Further, the provision of the line connection rejection circuit prevents plural information inputs from conflicting with each other.

Still further, the provision of the line connection permitting circuit makes it possible to receive urgent information even during reception of other information.

Further, the provision of the split display device makes it possible to display current information as well as new information such as urgent information concurrently on the display device, allowing the user to check necessary information received on real time.

Since the actuation of the line connection rejection circuit, the line connection permitting circuit and the split display device can selectively be permitted or inhibited, the user can readily obtain or display desired information. Therefore, missing of the desired information or sudden interruption of the display of the information can be prevented.

Further, the attendance conditions setting means permits the setting of the attended mode and the unattended mode for reception of all available information. This facilitates user's operations and prevents mode setting failure.

The provision of the schedule display controller prevents duplication of information inputs, and alerts the user to the input duplication.

What is claimed is:

1. A combination terminal unit comprising:
an inputting device for inputting a retrieval item and an option item, wherein a search is carried out regarding the input retrieval item via a plurality of different media;
line connecting means capable of establishing a line connection to at least one medium;
a storage device for storing therein a plurality of retrieval information entities;
a display device for displaying any of the retrieval information entities;
a retrieval controller for, when a retrieval item is inputted by the inputting device, reading out retrieval information entities relevant to the retrieval item from the storage device and displaying the information entities thus read out on the display device;
wherein the line connection means includes plural physical interfaces for connection to the plurality of media;
the retrieval controller further for, when a particular retrieval entity is selected from the displayed retrieval information entities by the inputting device, actuating the line connecting means to establish a line connection to a location of the particular retrieval information entity through one of the physical interfaces selected based on the selection of any one of the displayed retrieval information entities;
a scheduler for preliminarily specifying schedule information for establishing a line connection to a location of a predetermined information entity at a time designated by the inputting device;
a rejection period storage memory for storing therein a line connection rejection period; and
a line connection rejecting circuit for, when a current time is in the midst of the line connection rejection period immediately before the time specified in the schedule information by the scheduler, rejecting any line connection other than the line connection based on the schedule information specified by the scheduler.

2. A combination terminal unit comprising:
an inputting device for inputting a retrieval item and an option item, wherein a search is carried out regarding the input retrieval item via a plurality of different media;
line connecting means capable of establishing a line connection to at least one medium;
a storage device for storing therein a plurality of retrieval information entities;
a display device for displaying any of the retrieval information entities;
a retrieval controller for, when a retrieval item is inputted by the inputting device, reading out retrieval information entities relevant to the retrieval item from the storage device and displaying the information entities thus read out on the display device;
wherein the line connection means includes plural physical interfaces for connection to the plurality of media;
the retrieval controller further for, when a particular retrieval entity is selected from the displayed retrieval information entities by the inputting device, actuating the line connecting means to establish a line connection to a location of the particular retrieval information entity through one of the physical interfaces selected based on the selection of any one of the displayed retrieval information entities;
a scheduler for preliminarily specifying schedule information for establishing a line connection to a location of a predetermined information entity at a time designated by the inputting device;
a restriction period storage memory for storing therein a line connection restriction period; and
a line connection permitting circuit for permitting only a line connection to a particular medium during the line connection restriction period immediately before the designated time.

3. The combination terminal unit of claim 2, further comprising split display controller for, if the line connection permitting circuit permits the line connection to the particular medium, displaying information transmitted through the particular medium as well as information displayed at the time of the line connection on a split screen on the display device.

4. The combination terminal unit of claim 3, further comprising split display designating circuit for designating a medium through which information to be split-displayed is to be acquired, wherein if the particular medium permitted the line connection is the medium designated by the split display designating means, the split display controller split-displays the information transmitted through the particular medium.

5. A combination terminal unit comprising:

an inputting device for inputting a retrieval item and an option item, wherein a search is carried out regarding the input retrieval item via a plurality of different media;

line connecting means capable of establishing a line connection to at least one medium;

a storage device for storing therein a plurality of retrieval information entities;

a display device for displaying any of the retrieval information entities;

a retrieval controller for, when a retrieval item is inputted by the inputting device, reading out retrieval information entities relevant to the retrieval item from the storage device and displaying the information entities thus read out on the display device;

wherein the line connection means includes plural physical interfaces for connection to the plurality of media;

the retrieval controller further for, when a particular retrieval entity is selected from the displayed retrieval information entities by the inputting device, actuating the line connecting means to establish a line connection to a location of the particular retrieval information entity through one of the physical interfaces selected based on the selection of any one of the displayed retrieval information entities;

a scheduler for preliminarily specifying schedule information for establishing a line connection to a location of a predetermined information entity at a time designated by the inputting device;

a rejection period storage memory for storing therein a line connection rejection period;

a line connection rejecting circuit for, when a current time is in the midst of the line connection rejection period immediately before the time specified in the schedule information by the scheduler, rejecting any line connection other than the line connection based on the schedule information specified by the scheduler;

a restriction period storage memory for storing therein a line connection restriction period;

a line connection permitting circuit for permitting only a line connection to a particular medium during the line connection restriction period immediately before the designated time;

a split display controller for, when the line connection permitting circuit permits the line connection to the particular medium, displaying information transmitted through the particular medium as well as information displayed at the time of the line connection on a split screen on the display device; and actuation designating means for selectively permitting or inhibiting actuation of the line connection rejecting circuit, the line connection permitting circuit and the split display controller.

6. The combination terminal unit of claim 1, further comprising an attendance condition specifying circuit for specifying attendance information indicative of attendance or unattendance of a user, and information processing conditions in a user attended situation and in a user unattended situation.

7. The combination terminal unit of claim 1, further comprising schedule display controller for, if the schedule information is present, displaying the schedule information on the display device.

8. A storage medium storing therein a program which causes a CPU to perform the functions of:

allowing an operator to input a retrieval item and an option item;

establishing a line connection via a line connection function to at least one media, and wherein the line connection may be made to a selected one of a plurality of media based upon a corresponding plurality of physical interfaces;

storing a plurality of retrieval information entities in storage memory;

displaying the retrieval information entities;

when a retrieval item is inputted through the inputting function, reading out retrieval information entities relevant to the retrieval item from the storage memory and displaying the information entities thus read out through the displaying function and, when a particular retrieval information entity is selected from the displayed retrieval information entities through the inputting function, actuating the line connection function to establish a line connection to a location of the particular retrieval information entity via a selected one of the media out of the plurality of media, so that different selected entities are retrieved via different media;

preliminarily specifying schedule information for establishing a line connection to a location of a predetermined information entity at a time designated by the inputting function;

storing a line connection rejection period in a rejection period storage memory; and when a current time is in the midst of the line connection rejection period immediately before the time specified in the schedule information, rejecting any line connection other than the line connection based on the schedule information specified by the scheduler.

9. The unit of claim 1, wherein a search is carried out regarding the input retrieval item via a plurality of different media including at least two of the Internet, cable TV programs, and radio programs;

wherein the line connecting means is capable of establishing a line connection to a plurality of media via at least two of the Internet, cable television, and radio waves transmitted by antenna; and where the different selected entities are retrieved by the line connection means via at least two of the Internet, cable television, and radio waves transmitted by antenna, so that different types of information can be retrieved by the combination terminal unit via different types of communication mediums.

* * * * *